(12) United States Patent
Win

(10) Patent No.: US 8,678,459 B1
(45) Date of Patent: Mar. 25, 2014

(54) TRUCK LOAD PROTECTION APPARATUS

(71) Applicant: Joseph T. S. Win, Arcadia, CA (US)

(72) Inventor: Joseph T. S. Win, Arcadia, CA (US)

( * ) Notice: Subject to any disclaimer, the term of this patent is extended or adjusted under 35 U.S.C. 154(b) by 0 days.

(21) Appl. No.: 13/815,488

(22) Filed: Mar. 7, 2013

Related U.S. Application Data

(63) Continuation-in-part of application No. 13/065,958, filed on Apr. 4, 2011, now Pat. No. 8,550,527.

(51) Int. Cl.
*B60P 3/00* (2006.01)
*B60P 7/06* (2006.01)

(52) U.S. Cl.
USPC ............. 296/3; 296/100.06; 296/100.07; 224/402; 224/405

(58) Field of Classification Search
USPC ........... 296/3, 37.6, 37.7, 40, 100.06, 100.07, 296/118, 224; 224/402, 405, 484
See application file for complete search history.

(56) References Cited

U.S. PATENT DOCUMENTS

| | | |
|---|---|---|
| 2,997,330 A | 8/1961 | Boultinghouse |
| 4,057,281 A | 11/1977 | garrett |
| 4,531,775 A | 7/1985 | Beals |
| 4,957,400 A | 9/1990 | Karp |
| 5,009,457 A | 4/1991 | Hall |
| 5,110,021 A | 5/1992 | Dawson, Jr. |
| 5,190,337 A * | 3/1993 | McDaniel .................. 296/3 |
| 5,476,301 A | 12/1995 | Berkich |
| 6,224,140 B1 | 5/2001 | Hoplock |
| 6,446,997 B1 | 9/2002 | Bergman et al. |
| 6,607,229 B1 | 8/2003 | McIntosh |
| 6,799,784 B2 | 10/2004 | Rios |
| 7,246,839 B1 | 7/2007 | Nyberg |
| 7,513,548 B1 | 4/2009 | Win |
| 2004/0255439 A1 | 12/2004 | Benedict |
| 2008/0129067 A1* | 6/2008 | Rios ........................ 296/3 |

* cited by examiner

*Primary Examiner* — Glenn Dayoan
*Assistant Examiner* — Jason S Daniels
(74) *Attorney, Agent, or Firm* — William W. Haefliger

(57) ABSTRACT

Load protection assembly mounted on a truck, that comprises two side panels edge supported to pivot between horizontally extending down positions and operative up positions extending generally longitudinally, forward, intermediate, and rearward bars having end portions pivotally supported to enable bar pivoting between retracted positions proximate the panel and extended positions in which the bars extends laterally between the panels in panel supporting relation, and side bracing connected to the panels to move into supporting position when the bars are extended laterally between the panels, the bracing including a telescoping strut assembly having first and second elongated struts, and an actuator manually swingable to relatively extend and retract the struts configured to lock to bar structure in response to actuator swinging, and there being a carriage to which the forward and intermediate bars are end connected to be bodily moved with the carriage longitudinally forwardly and rearwardly.

25 Claims, 26 Drawing Sheets

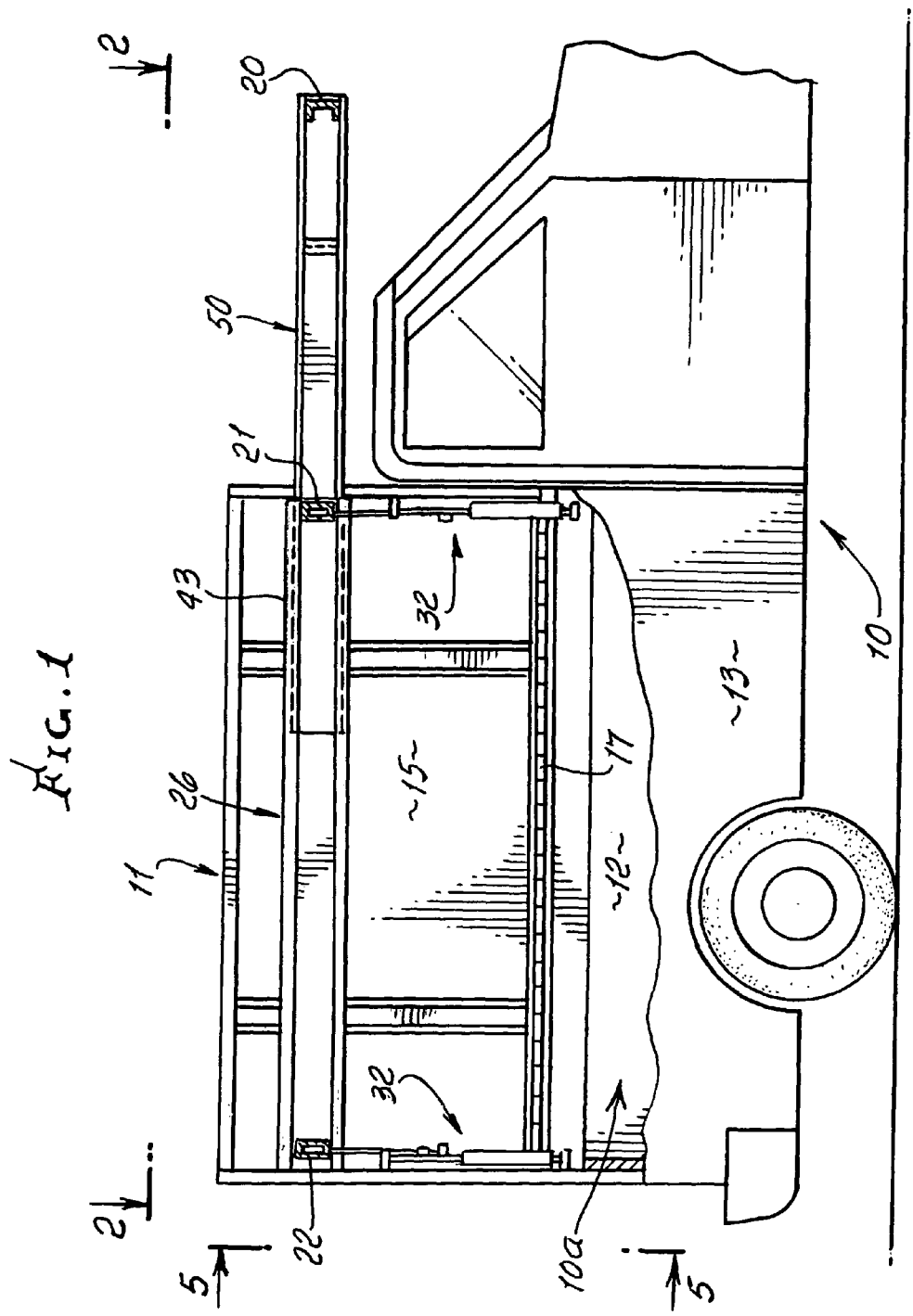

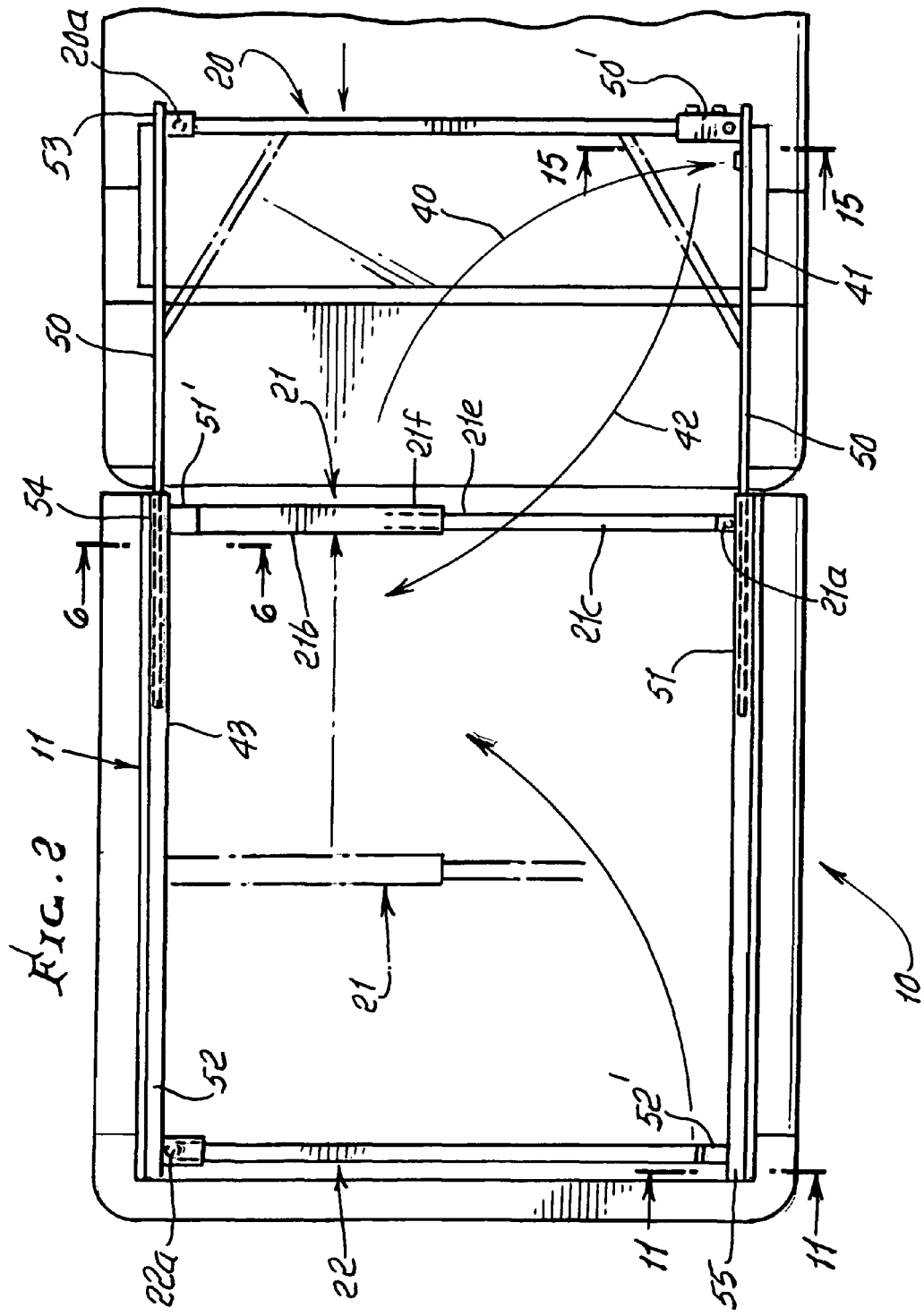

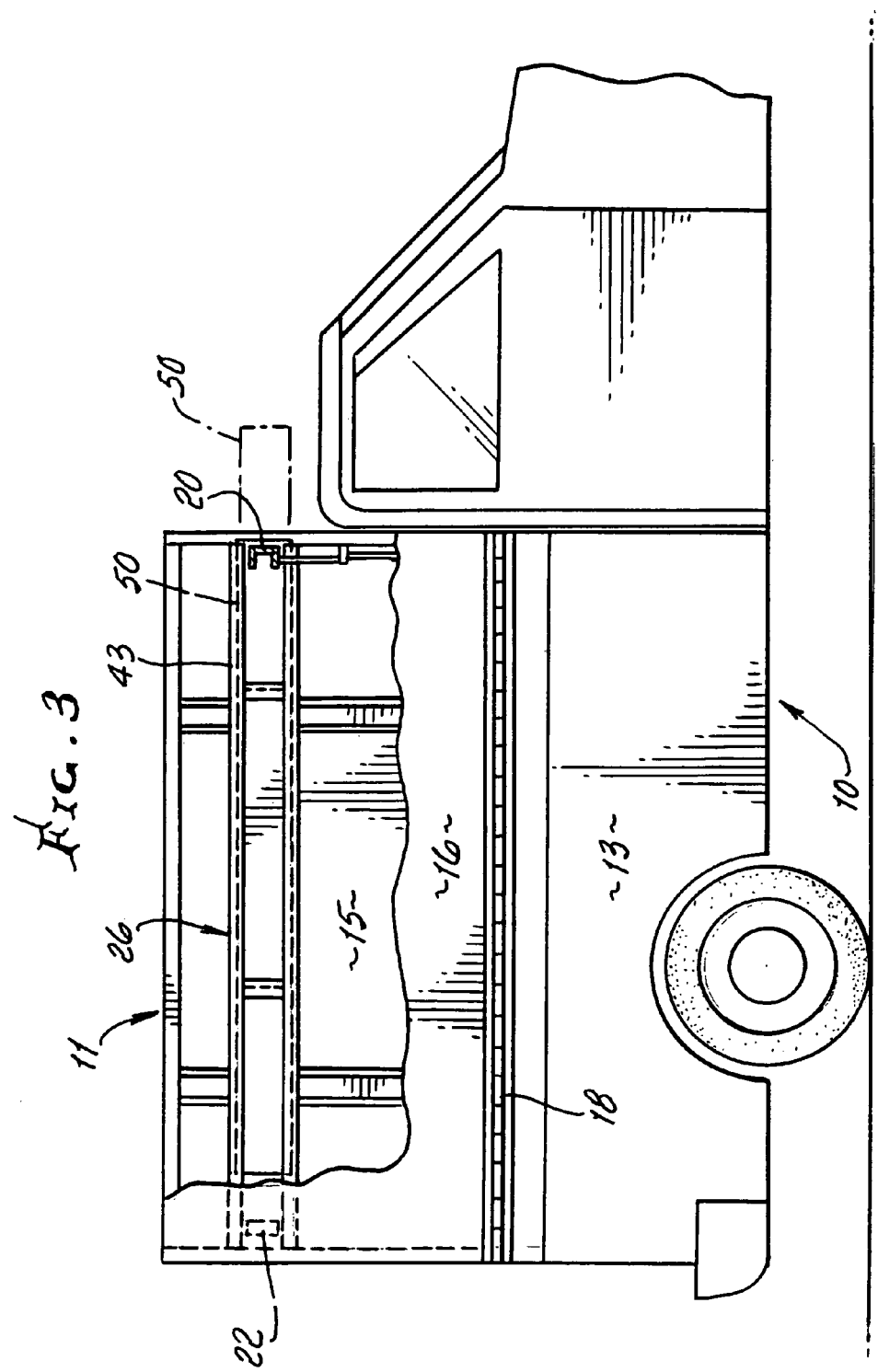

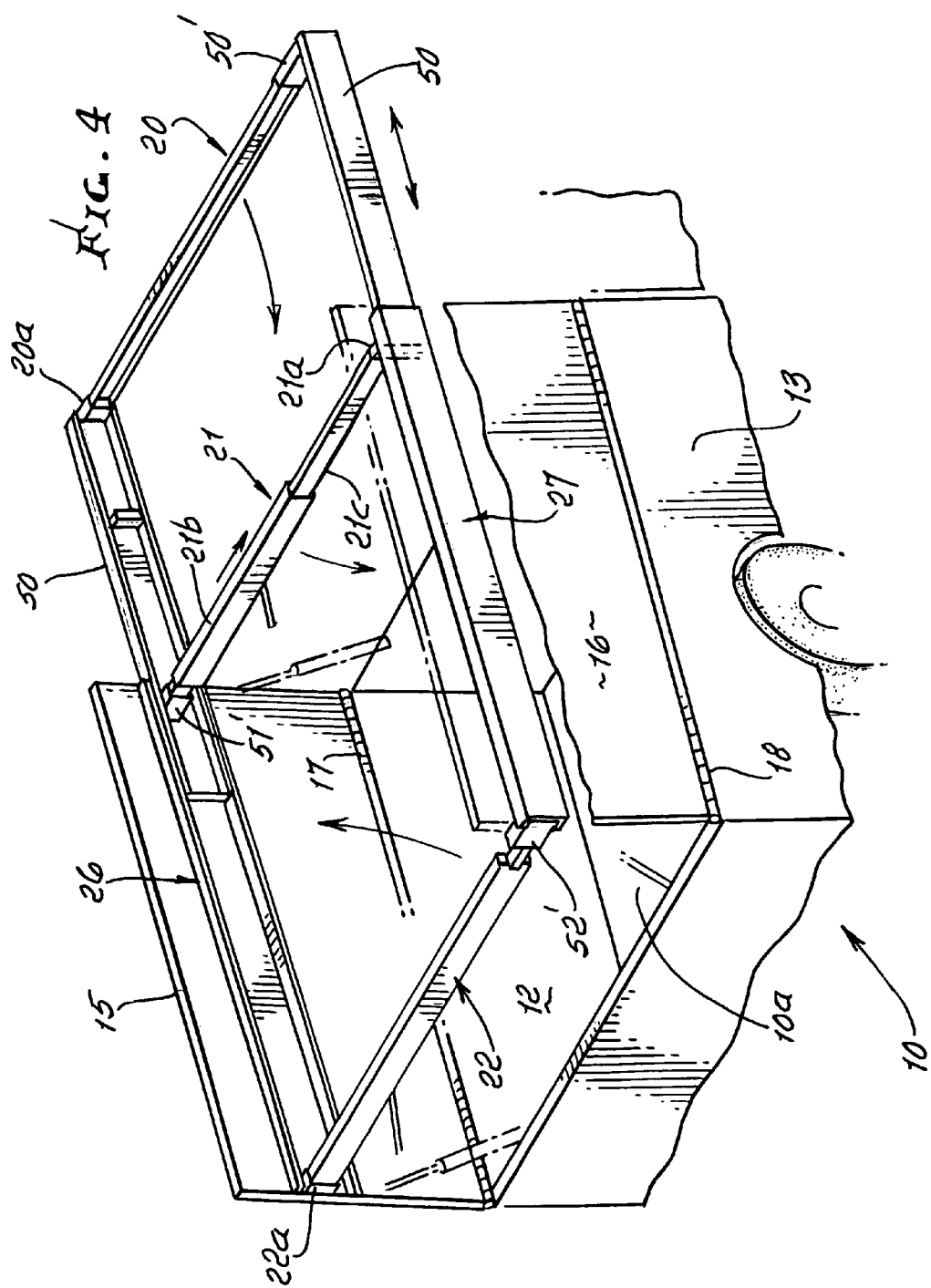

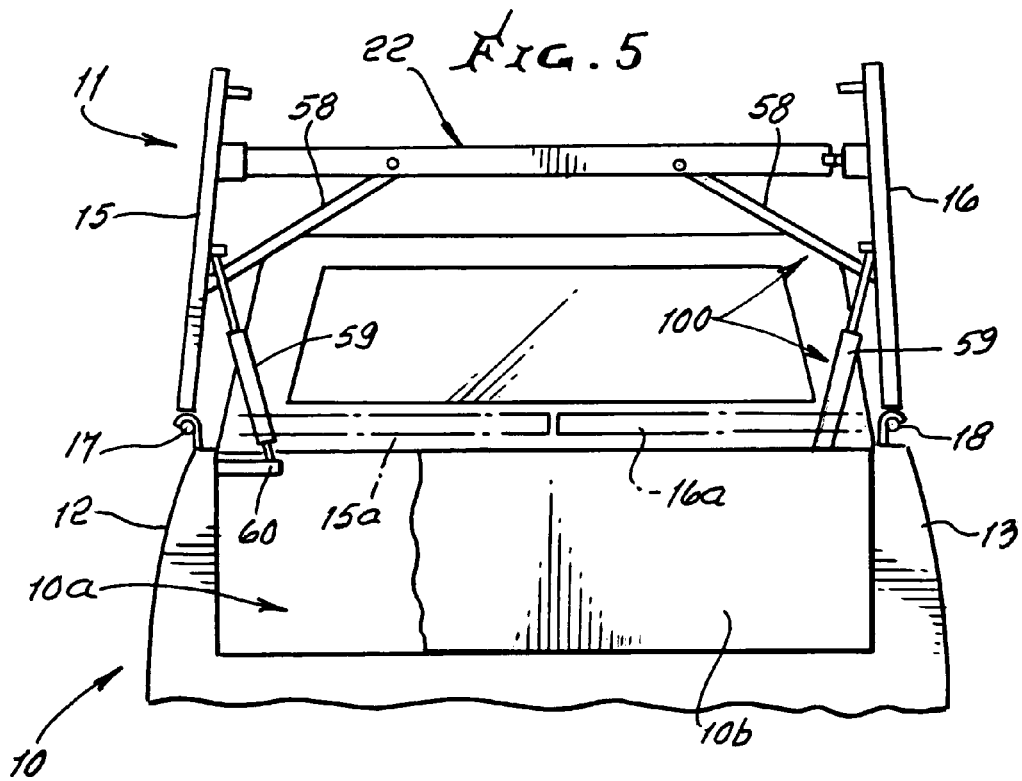
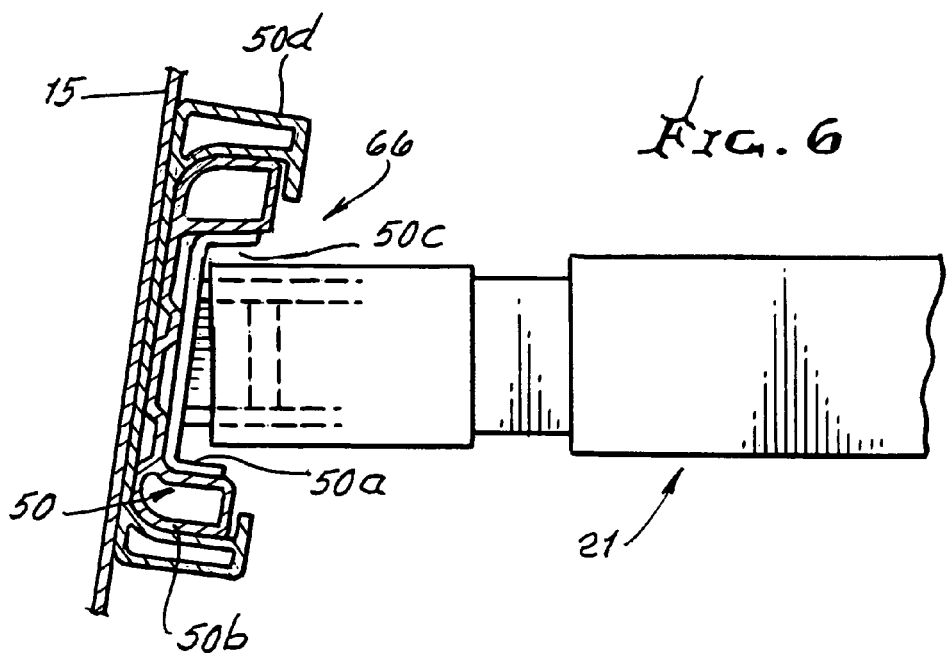

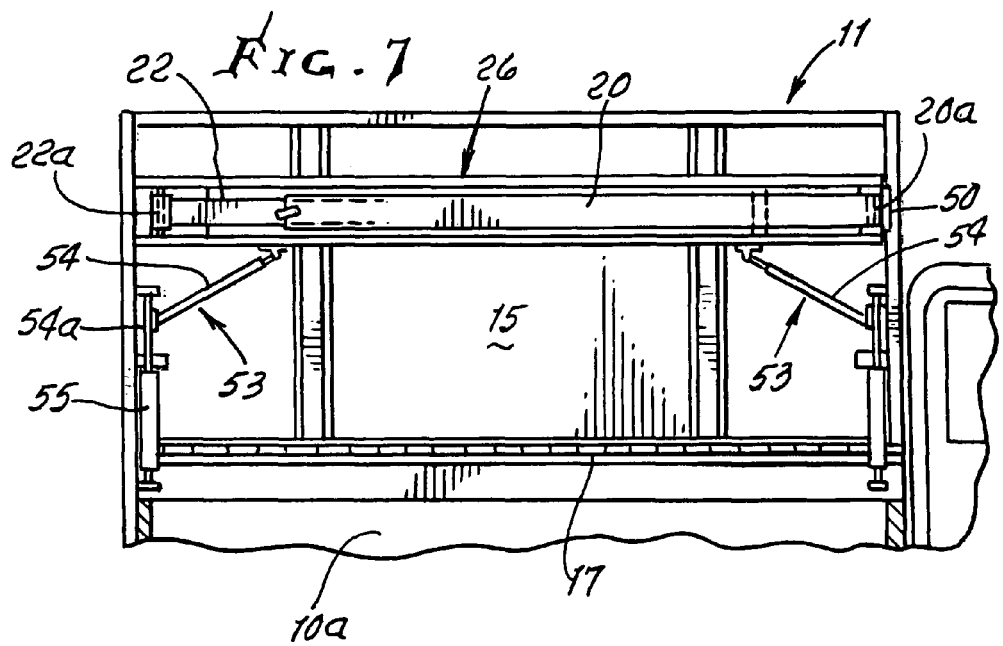
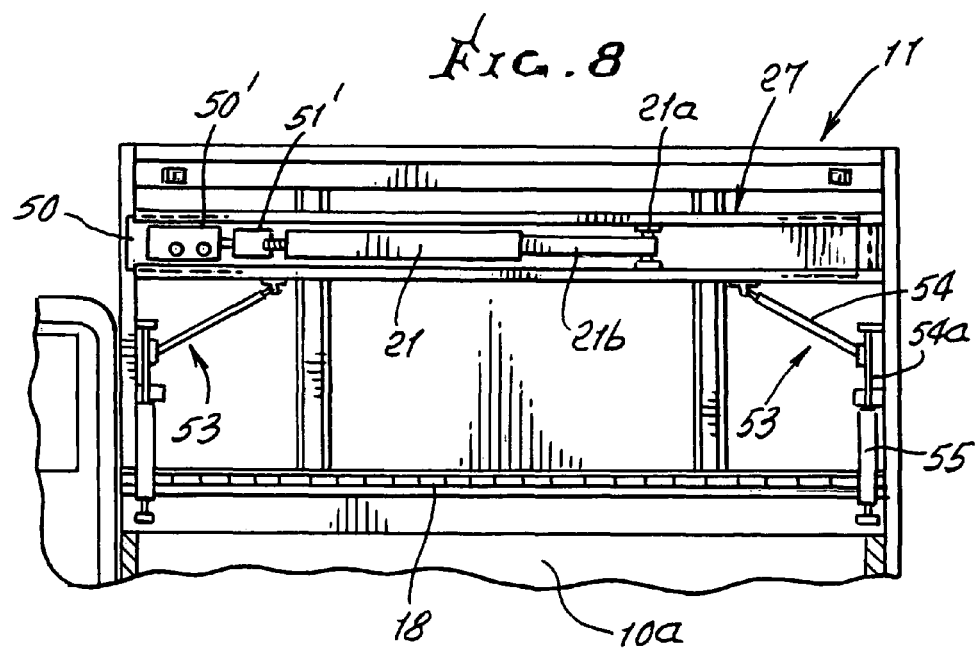

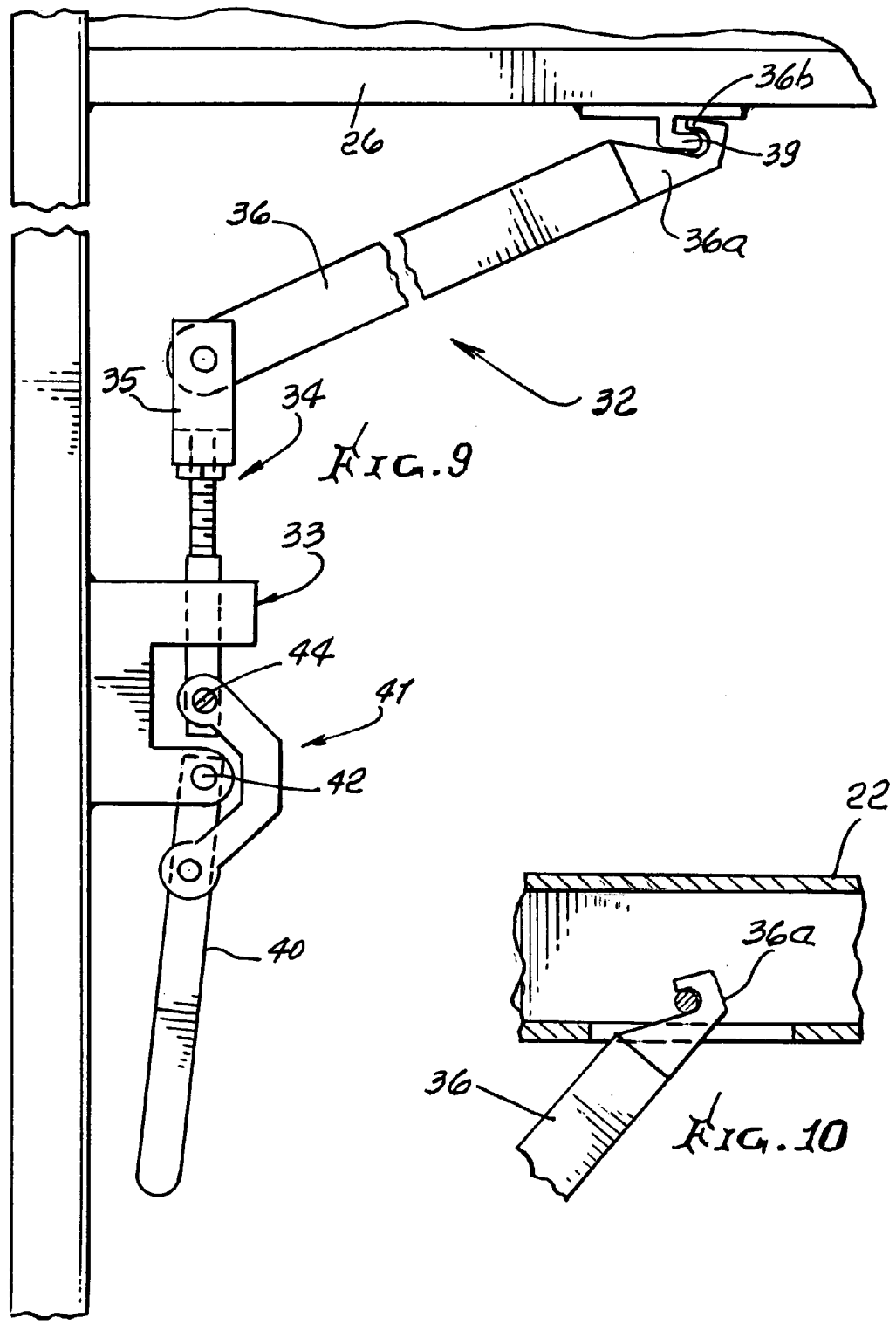

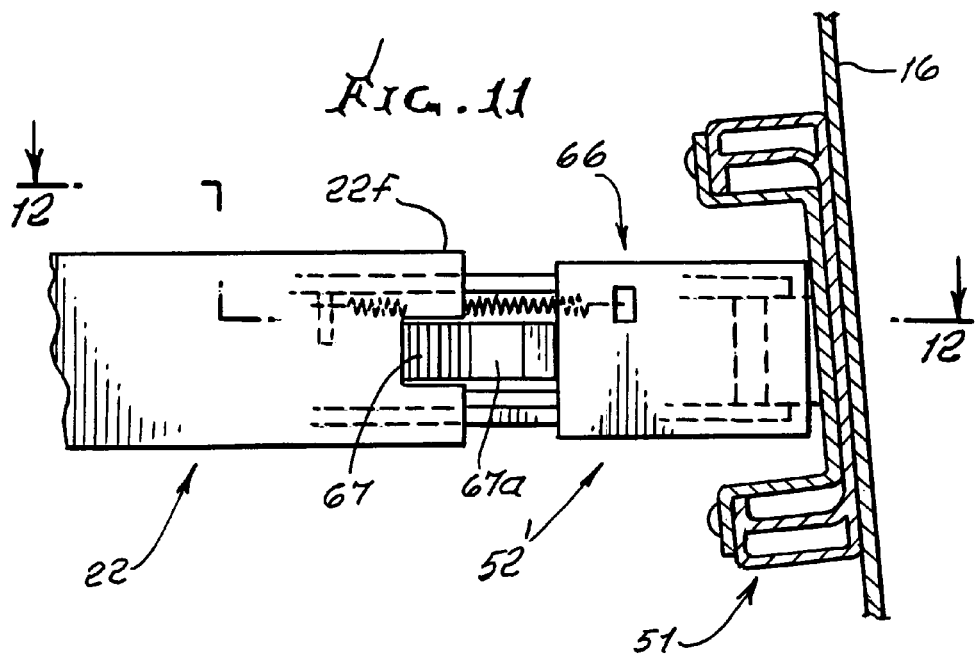
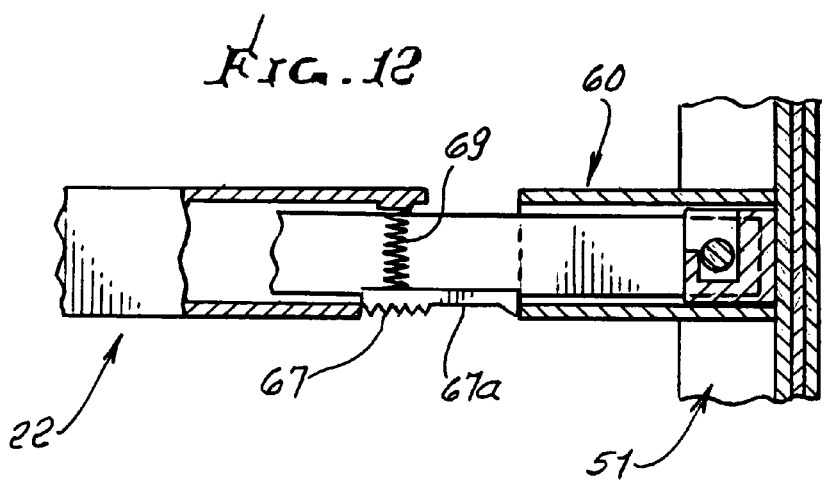

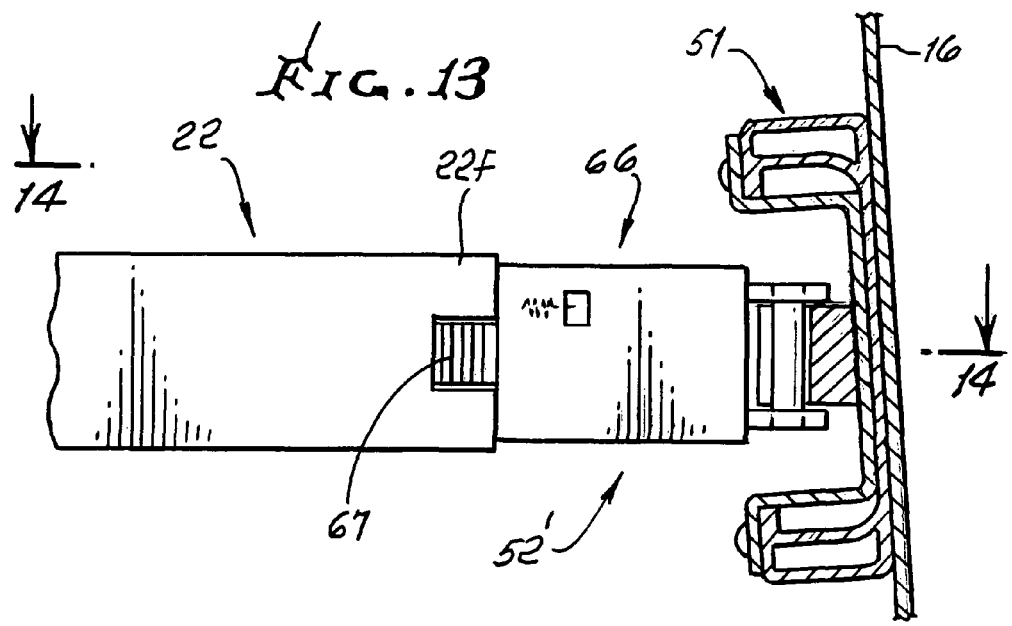
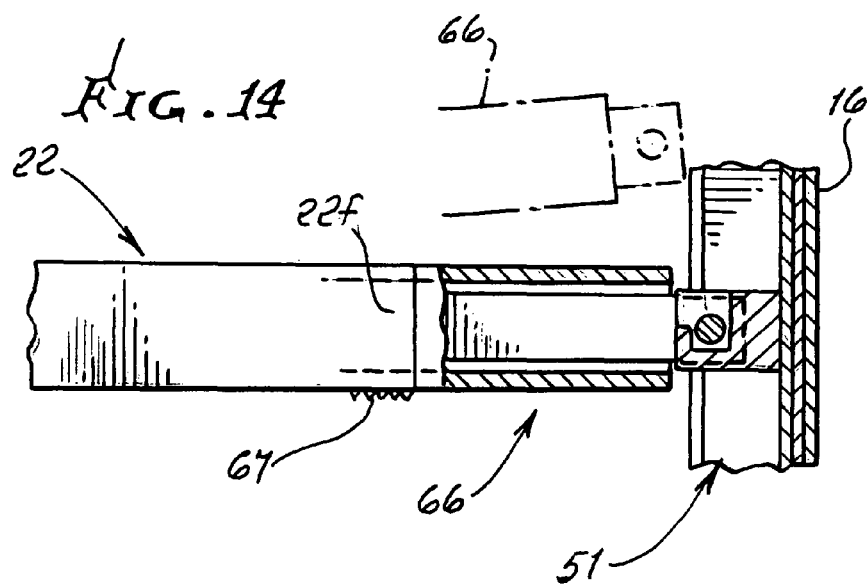

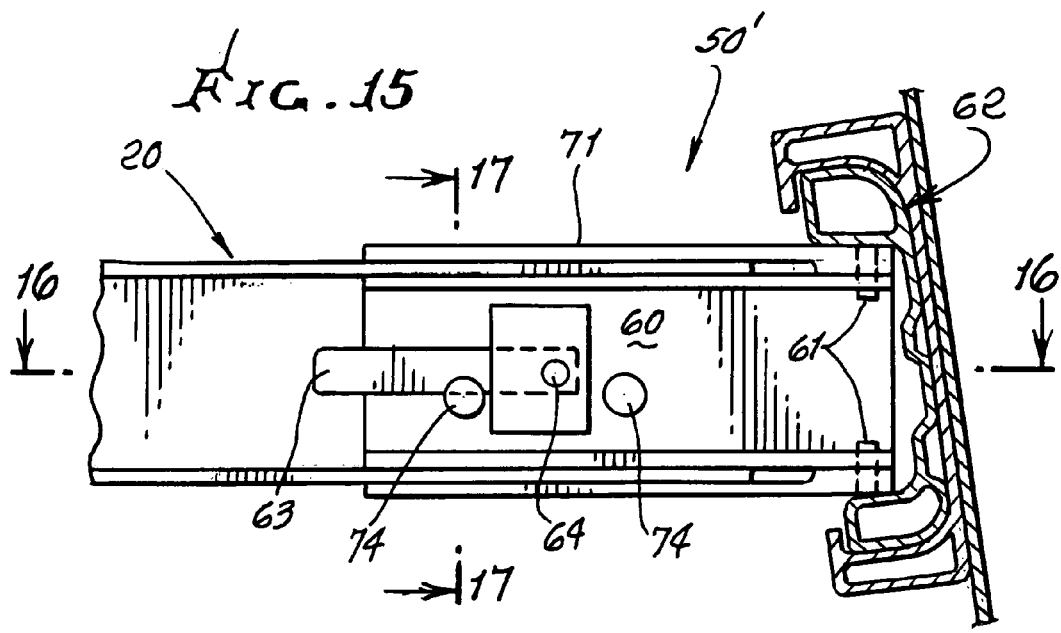
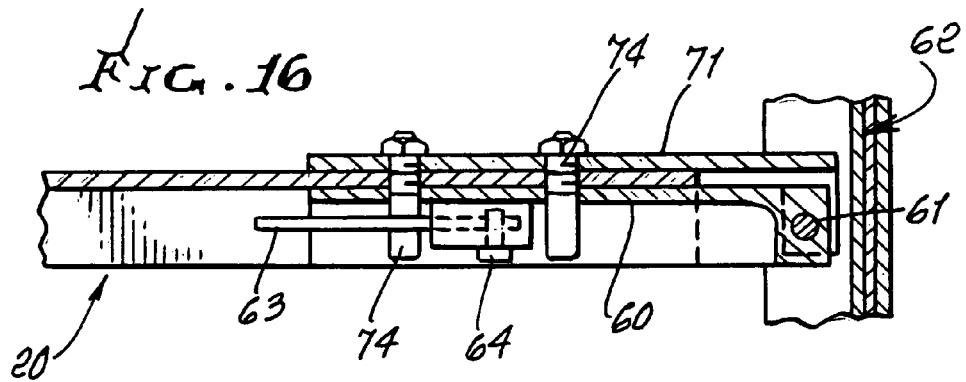
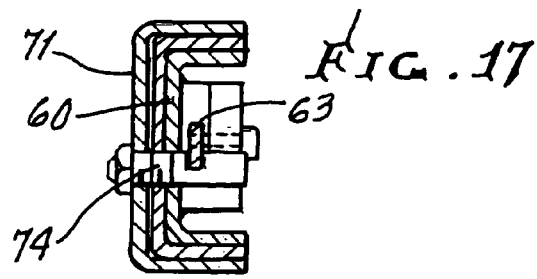

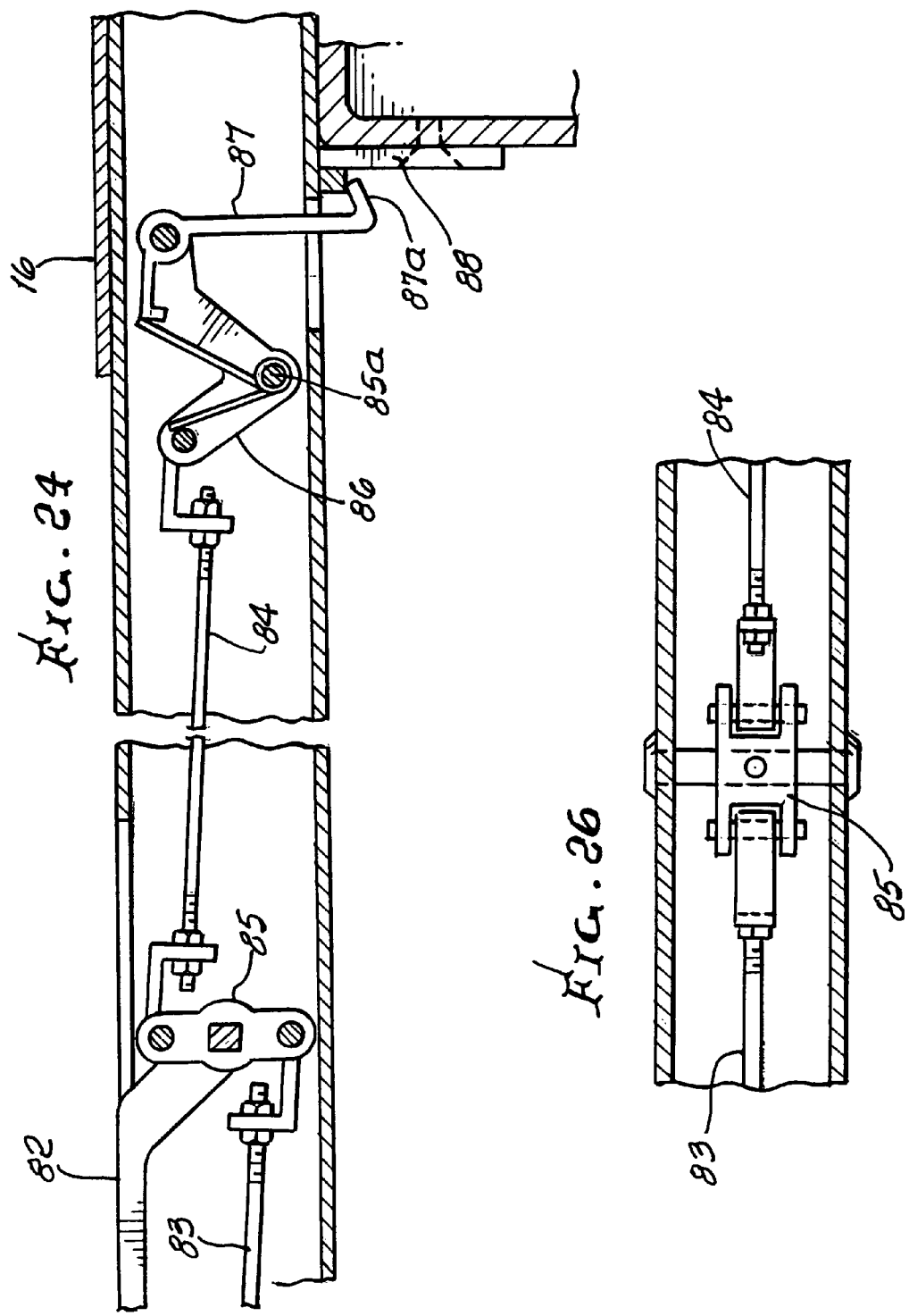

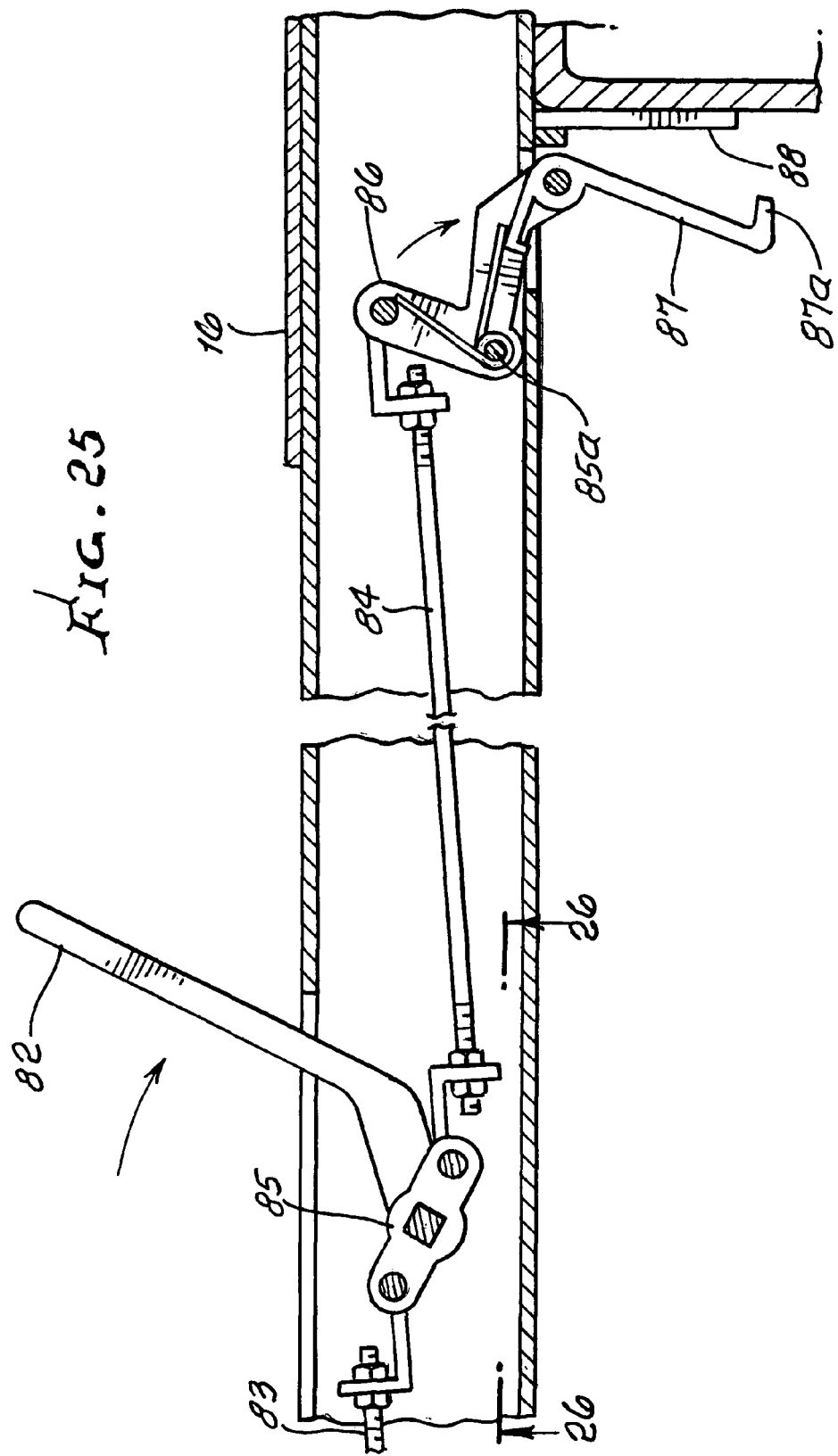

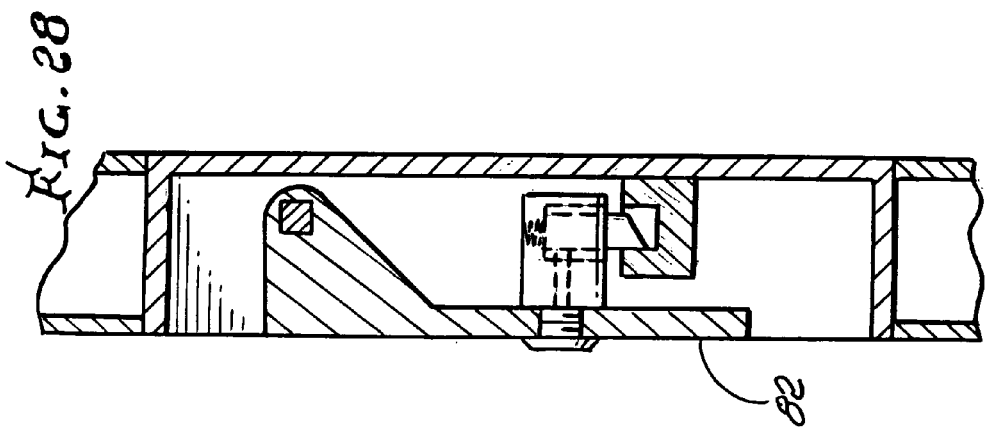
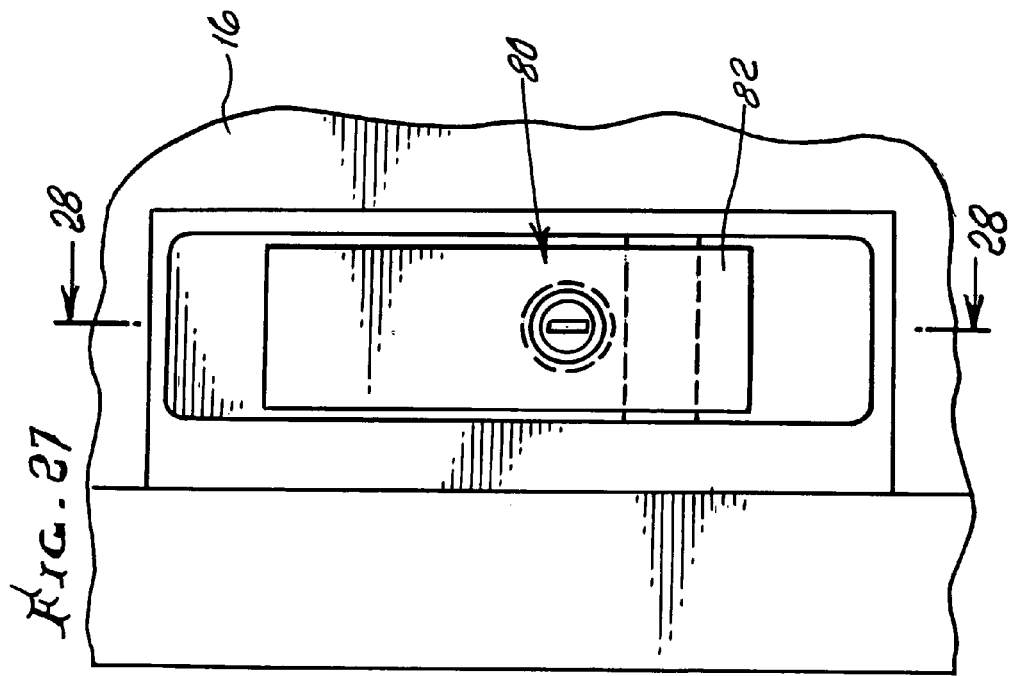

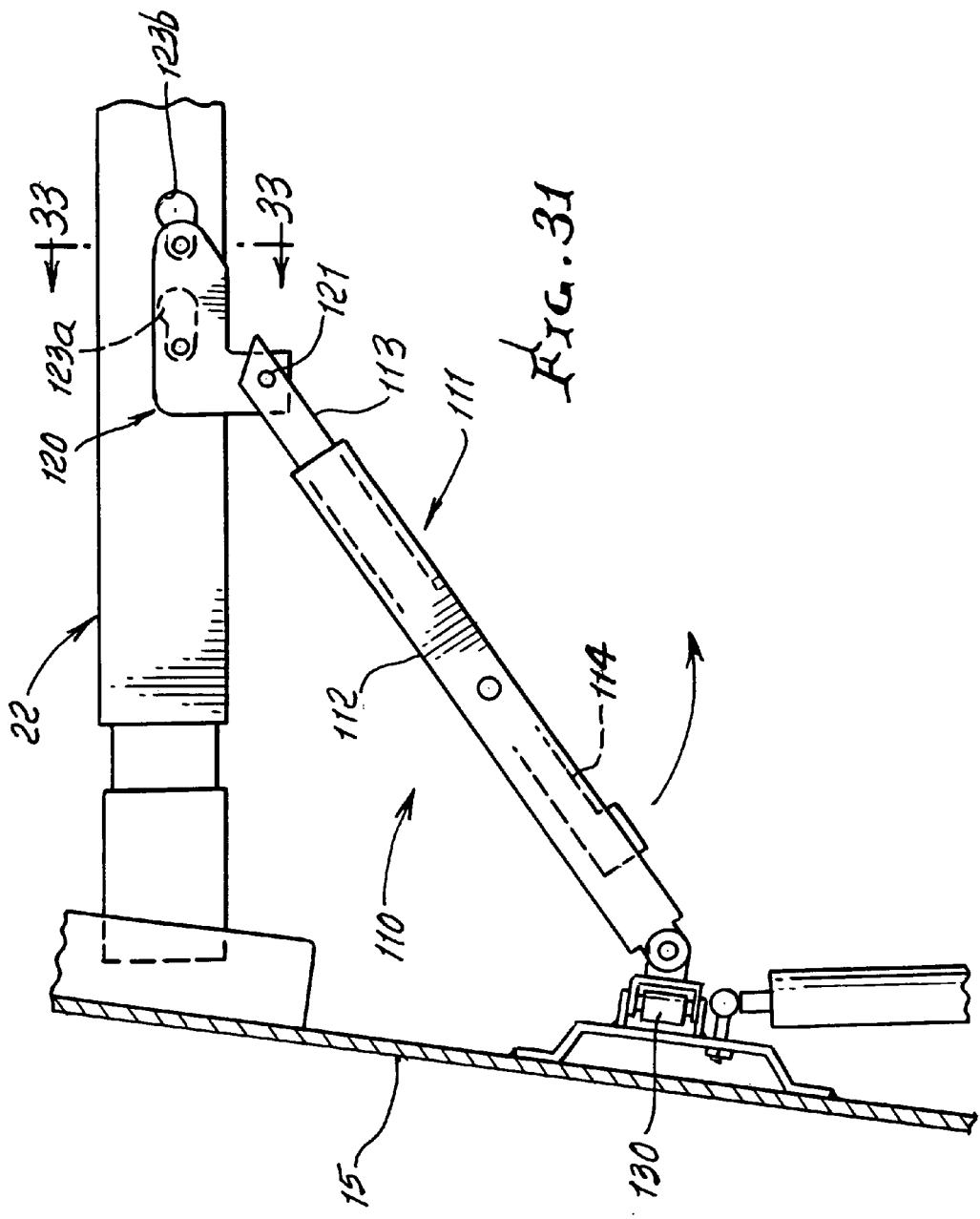

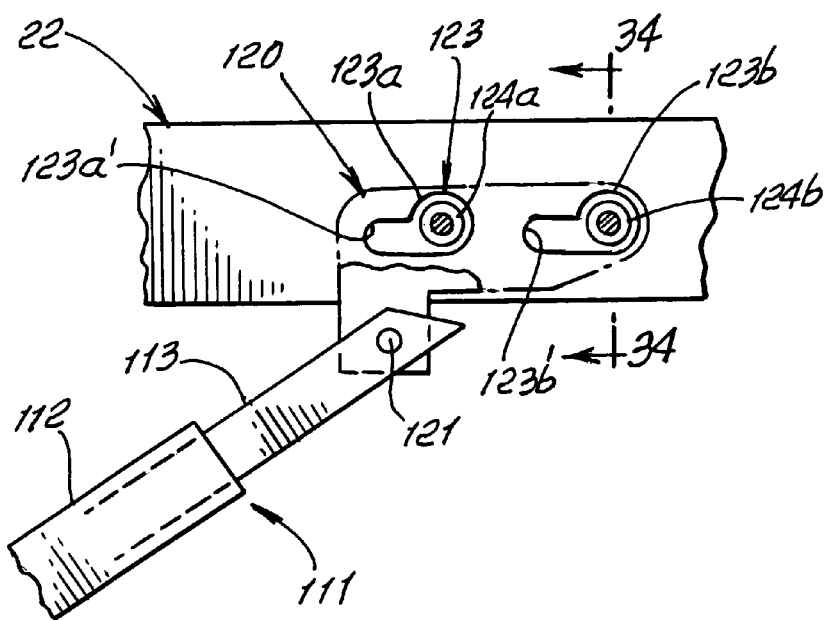
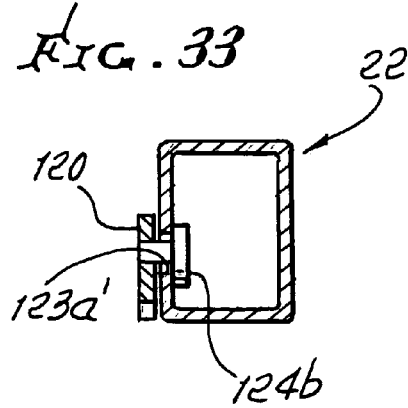 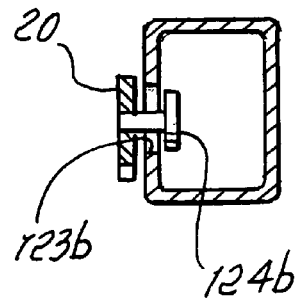

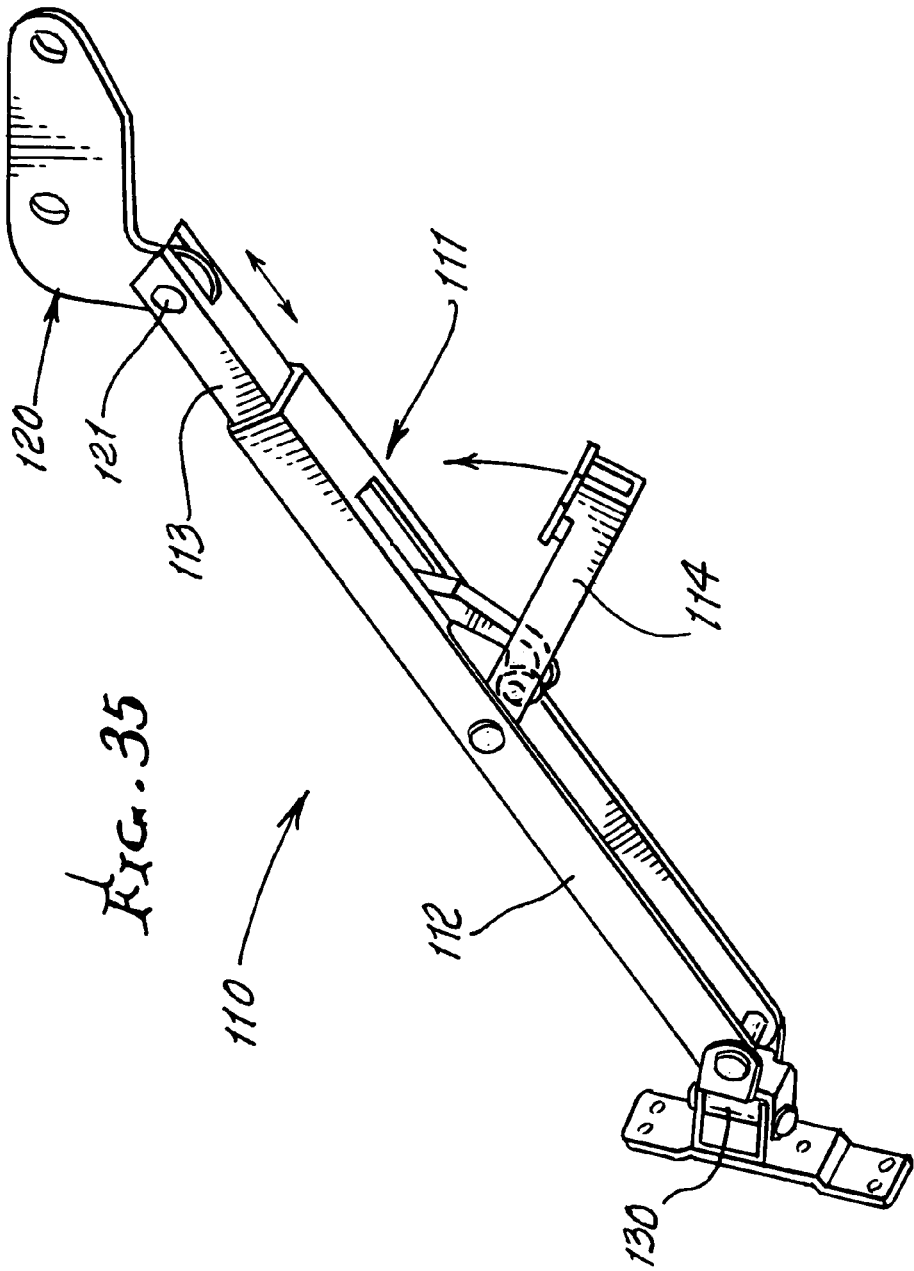

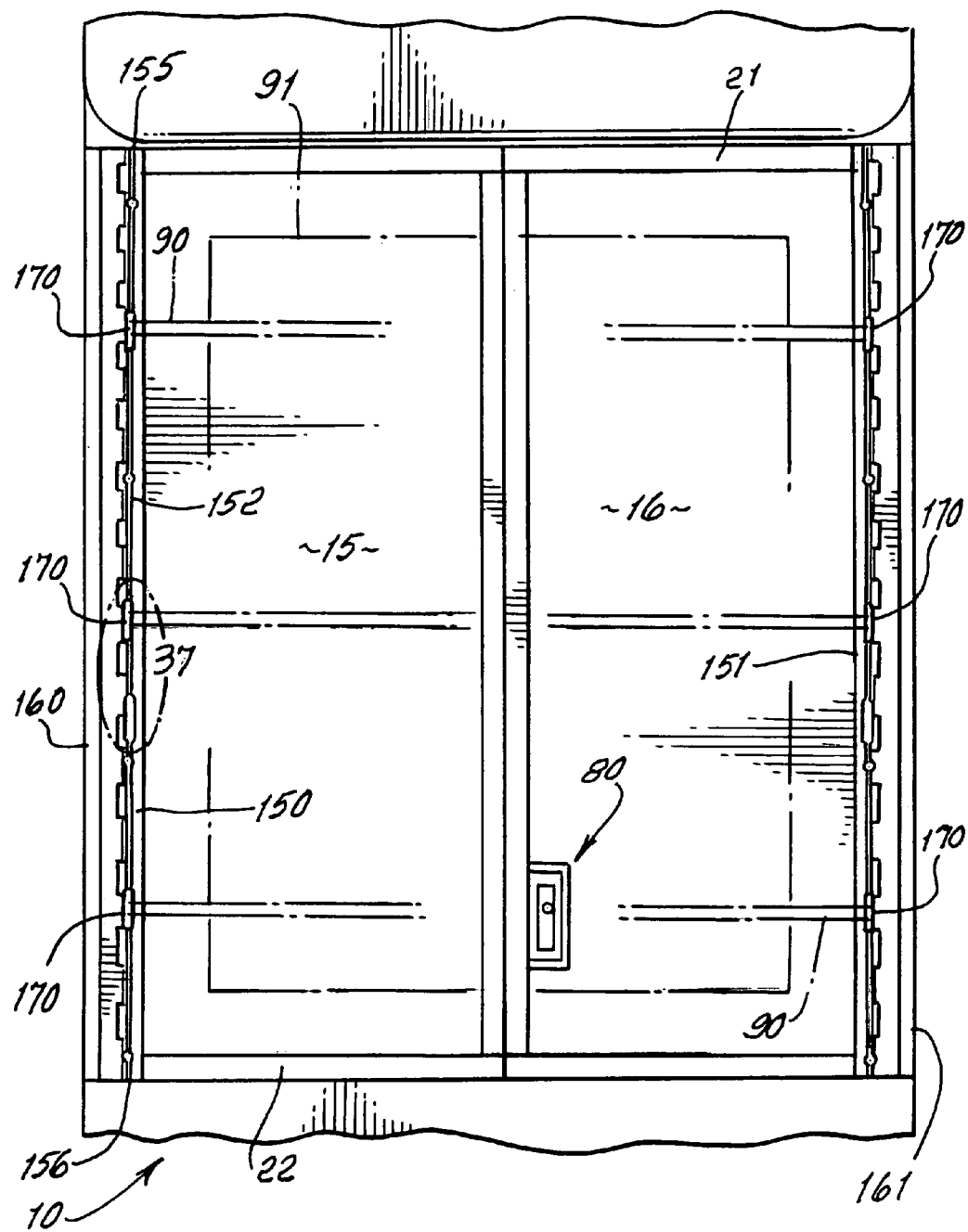

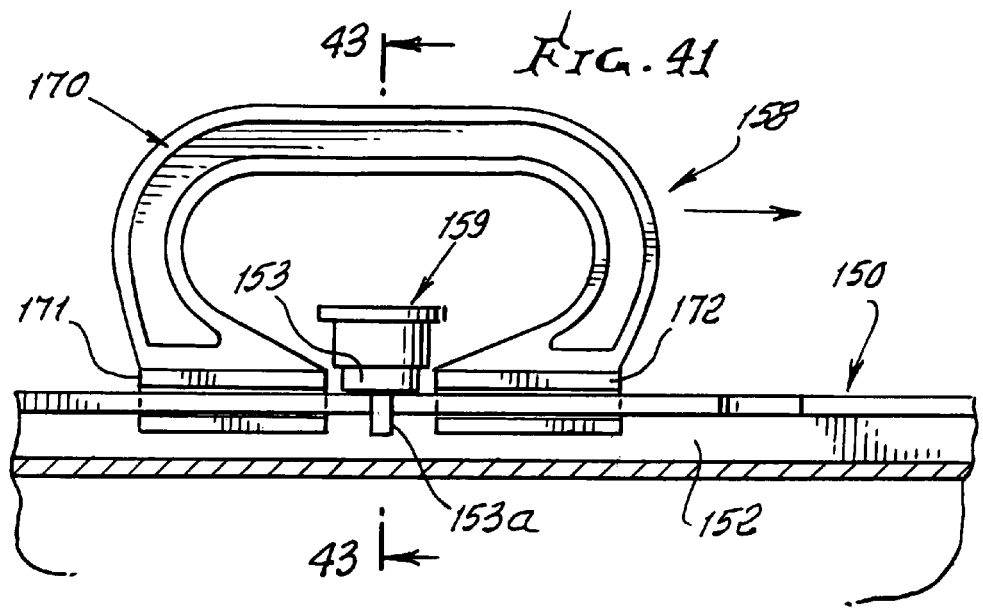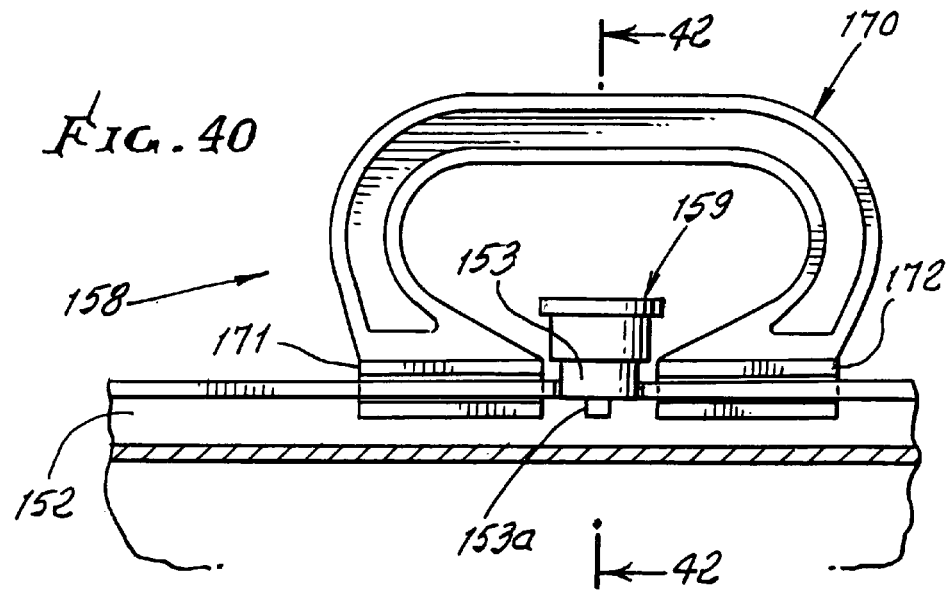

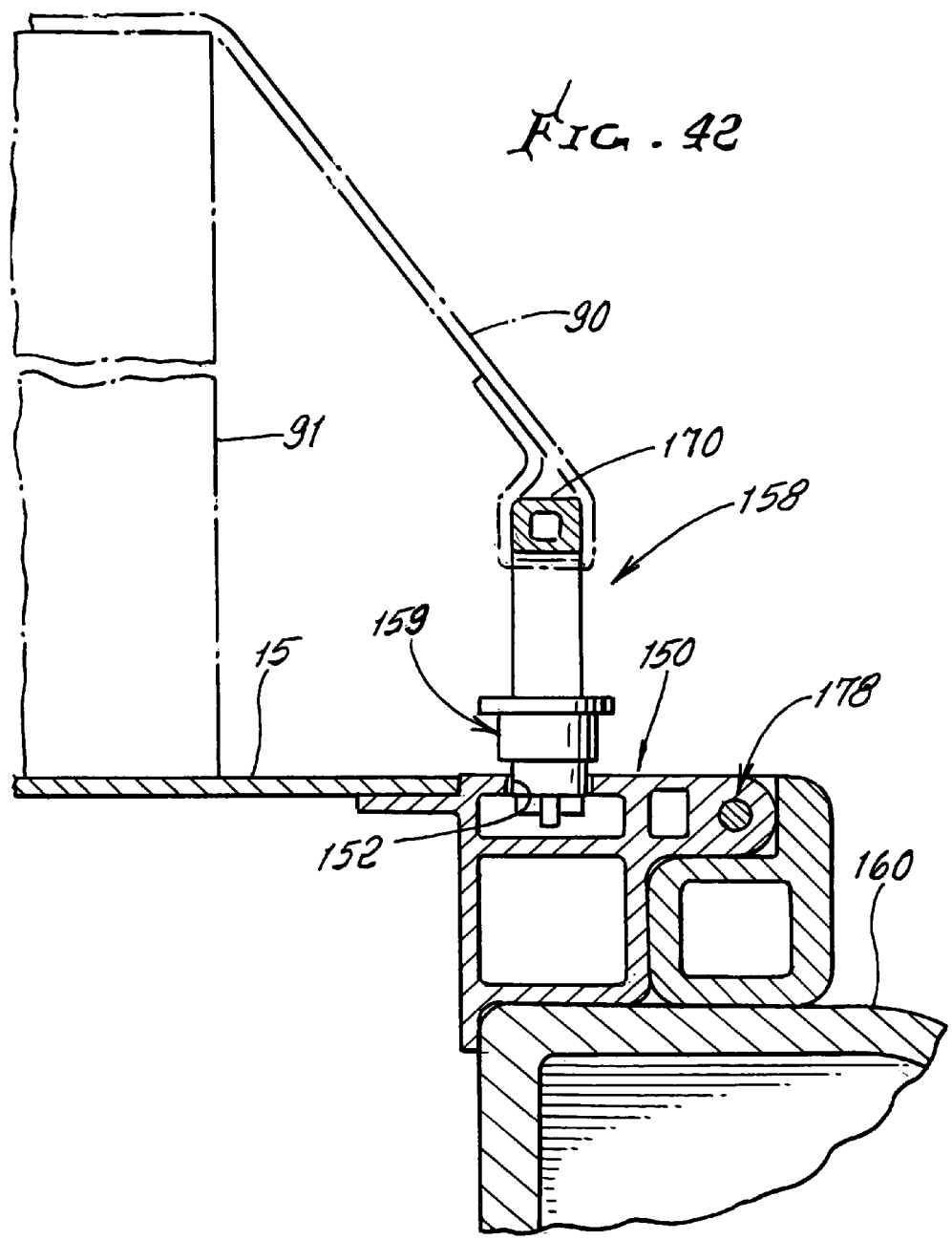

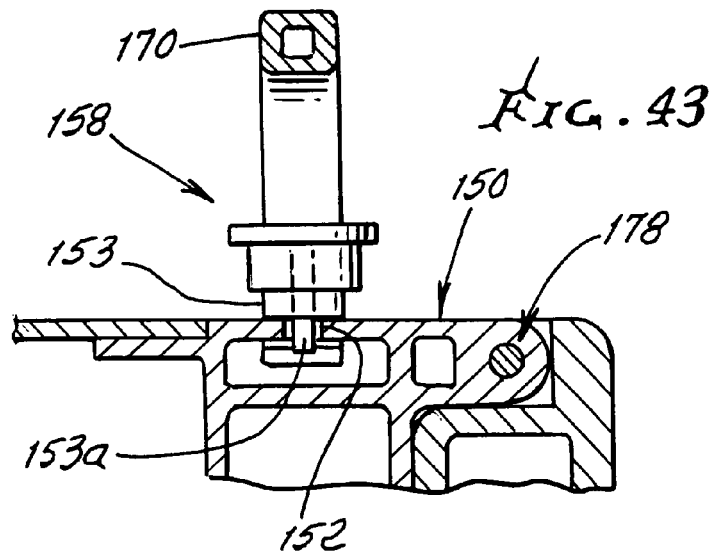
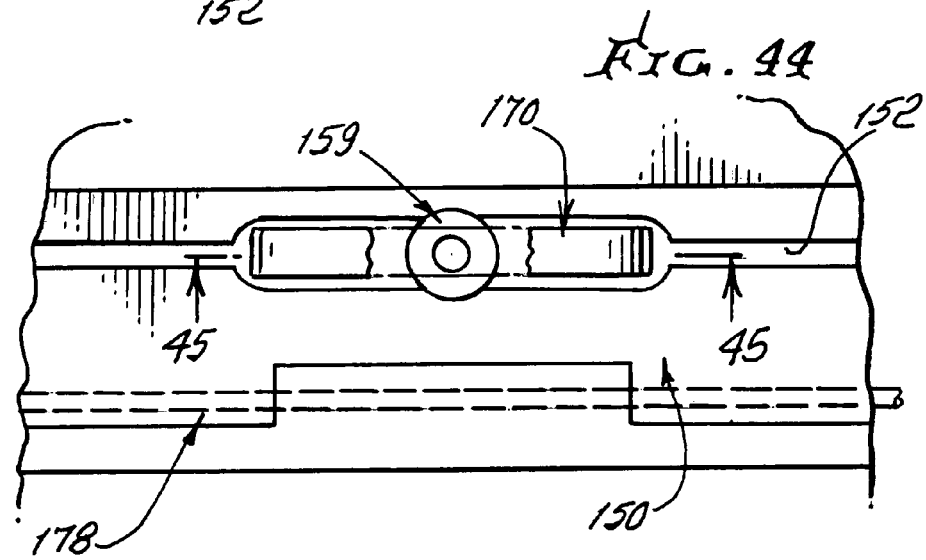
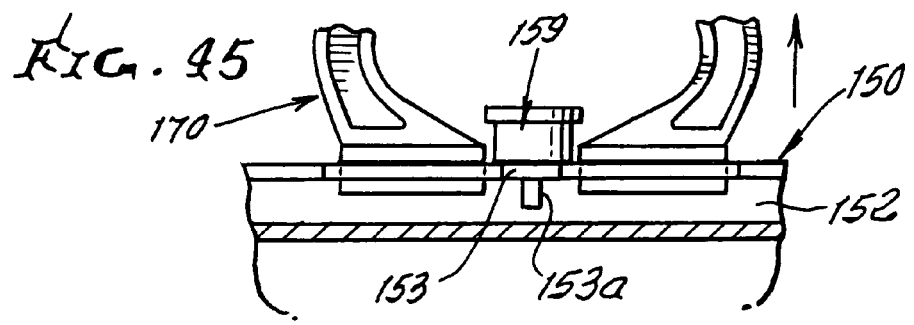

US 8,678,459 B1

TRUCK LOAD PROTECTION APPARATUS

This application is a continuation-in-part of pending U.S. application Ser. No. 13/065,958, filed Apr. 4, 2011.

BACKGROUND OF THE INVENTION

This invention relates generally to truck load protection, and more particularly to protective assemblies easily installed on a truck, in association with a truck bed and upright side walls or panels, to protect loads carried by the truck.

There is need for such assemblies characterized by high strength and ease of installation and use, particularly where the assembly is collapsible from raised, in-use position, to lowered generally horizontal position protected by a cover formed by lowered side panels. There is also need for the combination of pivotable structural elements, having unique interrelated functions and providing superior results, as are characteristic to the present invention.

SUMMARY OF THE INVENTION

It is a major object of the invention to provide highly compactly assembled apparatus meeting the needs as referred to above. Basically, the load protective assembly to be carried by a truck, comprises:

a) two side panels edge supported to pivot between horizontally extending down positions and operative up positions extending generally longitudinally, b) forward, intermediate, and rearward structural bars or cross members having end portions pivotally supported to enable bar pivoting between retracted positions proximate a panel or panels, and extended positions in which the bars project laterally between the panels in panel supporting relation, c) and side bracing connected to the panels to move into supporting position when the bars are extended laterally between the panels, said bracing including a telescopic strut assembly having first and second elongated struts, and an actuator assembly swingable to relatively extend and retract said struts configured to lock to bar structure in response to actuator swinging, Another object is to provide a locking bracket pivotally connected to one of the struts to lock the bracket to one of the bars.

That bracket typically has two lock elements linearly shiftable into and out of locking relation with said one bar.

Also, the actuator has a closed position in which it is retained to said struts during locking the bracket to said bar.

Yet another object is to provide the side braces or frames to have retracted positions adjacent the inner sides of the panels in which the side frames are positioned in unobstructing relation to endwise movement of the carriage. Also, the bars and side braces allow close down of the side panels into generally horizontal positions, for lock down, forming the cover to protect apparatus on the truck bed positioned beneath the cover.

A further object includes provision of holders releasably retaining to panel structure to rails carried by truck fixed side panels, and shiftable between panel tie down positions, and panel release positions.

An additional object includes providing for organization of the bars and side panels, to allow ready forward displacement and rearward retraction of the carriage, relative to and above a truck vehicle forward cab.

These and other objects and advantages of the invention, as well as the details of an illustrative embodiment, will be more fully understood from the following specification and drawings, in which:

DRAWING DESCRIPTION

FIG. 1 is a side view of a truck, with installed apparatus incorporating the invention;

FIG. 2 is a top plan view taken on lines 2-2 of FIG. 1;

FIG. 3 is a side view like FIG. 1, showing retracted condition of a forward extension;

FIG. 4 is a top, side and end view of the FIG. 1 apparatus, with the forward extension in extended position;

FIG. 5 is a rear elevation taken on lines 5-5 of FIG. 1;

FIG. 6 is an enlarged elevation taken on lines 6-6 of FIG. 2, and showing nested rail structure supporting a cross member;

FIG. 7 is an elevation showing the interior facing side of an apparatus left side panel, in elevated position;

FIG. 8 is an elevation showing the interior side of an apparatus right side panel, in elevated position;

FIG. 9 is a fragmentary elevation showing the brace structure retracted toward and adjacent a side panel, for storage of that brace structure;

FIG. 10 is an enlarged fragmentary elevation showing brace structure extended away from a side panel in order to support a cross-member or bar that extends between the two side panels;

FIG. 11 is an enlarged elevation taken on lines 11-11 of FIG. 2, showing a rear cross member being connected to a side panel;

FIG. 12 is an enlarged plan view taken in section on lines 12-12 of FIG. 11;

FIG. 13 is a view like FIG. 11, but showing completion of connection of the cross member to the side panel;

FIG. 14 is an enlarged plan view taken in section on lines 14-14 of FIG. 13;

FIG. 15 is like FIG. 13, but showing a modified cross member connection to the side panel;

FIG. 16 is an enlarged plan view taken in section on lines 16-16 of FIG. 15;

FIG. 17 is an elevation taken in section on lines 17-17 of FIG. 15;

FIG. 24 is an elevation taken on lines 24 of FIG. 20, and showing locking apparatus;

FIG. 25 is a section like FIG. 24, showing the apparatus in unlocked position;

FIG. 26 is a plan view taken on lines 26-26 of FIG. 25;

FIG. 27 is an enlarged plan view showing FIG. 26 lock details;

FIG. 28 is a section taken on lines 28-28 of FIG. 27;

FIG. 31 is an enlarged detailed view of the FIG. 29 brace;

FIG. 32 shows brace unlocked positioning;

FIGS. 33 and 34 are sections showing locked and unlocked positions;

FIG. 35 is a perspective view of brace structure;

FIG. 36 is a view like FIG. 20, showing improved tie down;

Figure 21:
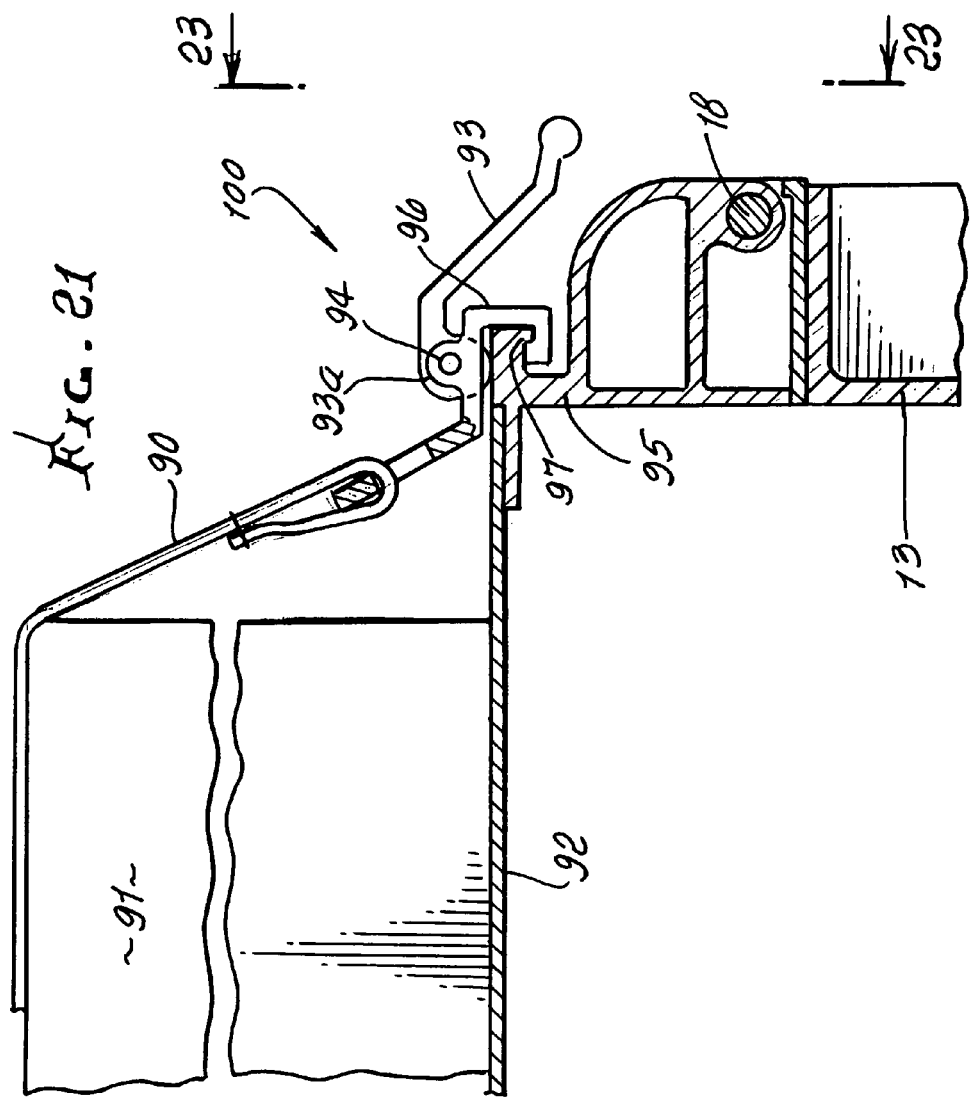
FIG. 21 is an enlarged elevation view taken on-lines 21-21 of FIG. 20, showing a handle in lowered, load strap retaining position.
Figure 37:
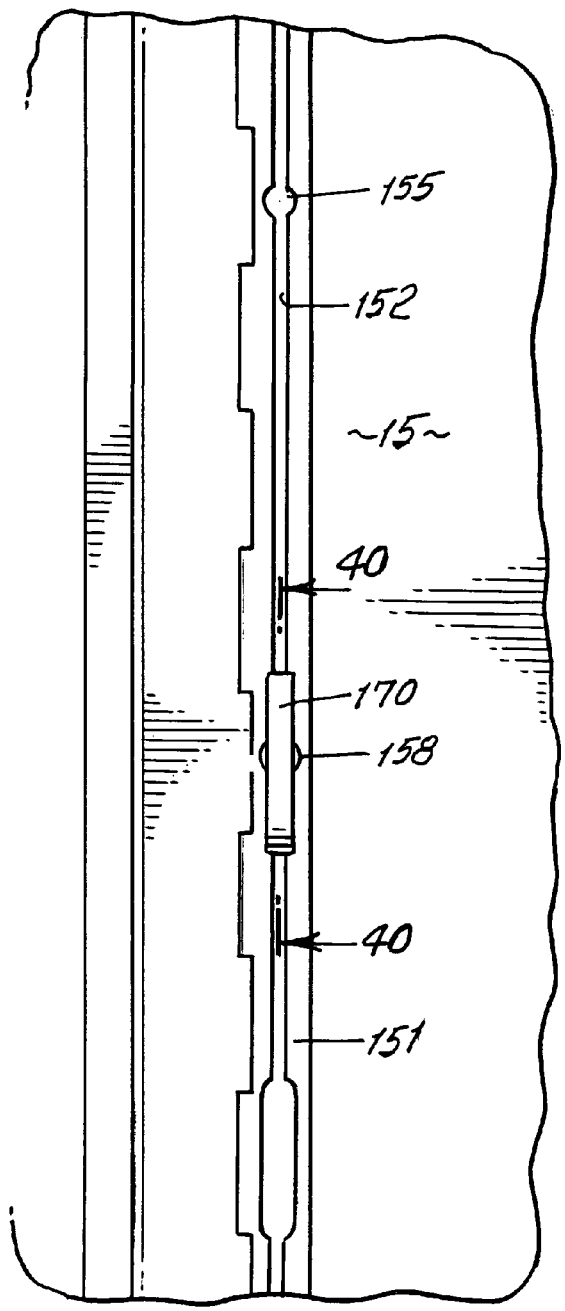
FIG. 37 is an enlarged view taken on lines 37-37 of FIG. 36.
Figure 38:
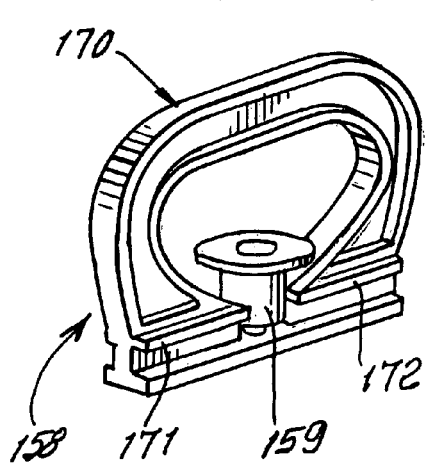
Figure 39:
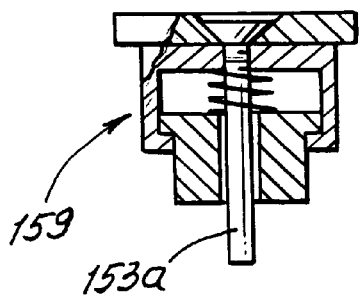

FIG. 38 in perspective shows tie down retainer means;

FIG. 39 is a section showing tie down through pin structure;

FIGS. 40 and 41 are enlarged sections taken on lines 40-40 of FIG. 37;

FIG. 42, like FIG. 21, shows enlarged tie down blocking;

FIGS. 43-45 show tie down structure, unblocked.

DETAILED DESCRIPTION

Referring first to FIGS. 1 and 5, truck 10 carries the load protective assembly 11 mounted for example on upright truck side walls or panels 12 and 13. The truck bed extending between 12 and 13 is indicated at 10a. A tail gate is shown at 10b.

The assembly includes the two opposite side panels 15 and 16 pivotally carried by 13 and 14, as at hinge locations 17 and 18. The panels 15 and 16 are pivotable between horizontally extending down or lowered positions indicated at broken lines 15a and 16a in FIG. 5, and up-position shown at full lines 15 and 16 in FIG. 5, in which the panels extend generally longitudinally forwardly, relative to the truck.

Referring to FIG. 2, the assembly also includes forward support bar 20, intermediate bar 21 having two telescoping sections 21b and 21c, and rearward bar 22. The bars are pivotally supported at their ends 20a, 21a and 22a by elongated rack parts 50-52 to enable bar pivoting between retracted positions proximate a panel and extended positions in which the bars extend laterally between the panels in panel supporting relation. See for example the bars in laterally extended positions in FIGS. 2-4, and longitudinally extending retracted positions shown for example in FIGS. 7 and 8. In the retracted latter positions, the bars protectively and sidewardly nest in the rack or frame side 50-52 members carried by and at the tops of the side panels.

FIGS. 2 and 4 shows bar 22 hinge connected to rack member 52; bar 21 hinge connected to rack member 51; and bar 20 hinge connected to rack member 50.

Also provided are side frames or braces carried by the panels to pivot approximately 90° from inactive positions adjacent the upright side panels into active positions for structurally supporting the bars when the bars are extended into positions supporting the side panels. See in this regard FIG. 9 showing a side brace structure 32 (in inactive or stored position) that includes a vertical pivot 33, a threaded adjuster 34 projecting upright from 33, an upright link 35 carried by 34, and an elongated connector 36 extending diagonally between link 35 and an adjustable hook connection member 36a providing a hooked end 36b connected to hook 39 integral with frame 26. When pivoted handle 40 is rotated clockwise, a connection 41 pulls link 35 downwardly, displacing part 36 downwardly to tighten the hooks 36b and 39. Similar swiveled braces 32 are provided proximate the pivoted ends of the bars 20 and 21 carried by the side panels. See FIG. 1. C-shaped holder 41 pivotally supports handle 40 at 42, and the pivot 33; and a connector 44 pivotally connects the handle and pivot 33. Such bracing provides lateral bracing of the structure.

FIGS. 7 and 8 show longitudinal bracing 53 of the structure. See diagonal links 54 extending downwardly and longitudinally from frame rack members 26 and 27 to connect to vertically adjustable plungers 54 projecting from cylinders 55 attached to truck side panels 15 and 16. FIG. 5 shows that the side panels 15 and 16 may be additionally brace supported at 100 by diagonal plunger and cylinder elements 58 and 59 anchored at 60 to truck side panels.

FIG. 6 shows a pivoted connection at 66 between a bar end, for example bar 21, and forwardly extending rack structure 50. The latter is channel shaped, and includes multiple, mutually supporting channel members 50a and 50b that interfit as shown, the rack structure providing space 50c facing toward the extended bar, to allow for bar nesting after retraction pivoting toward the rack. Rack or carriage structure 50 associated with bar 21, is forwardly slidable, relative to frame structure 50a carried by side panel 15, i.e. between retracted position as seen in FIG. 3, to forwardly extended positioning seen in FIGS. 1 and 2. Carriage channel bar shaping and bar nesting also enhances strength.

It will be seen from FIG. 2 that portion 21e of bar 21 may be retractingly telescoped onto position 21f of that bar, prior to being pivoted forwardly (see arrow 40) toward and against frame part 41 for storage. This is typically prior to rearward pivoting (see arrow 42) of bar 20 toward and adjacent frame part 42, prior to carriage endwise movement, in between FIG. 1 and FIG. 3 positions.

Also provided is or are lock means for locking the swingable ends of the bars to structure carried by at least one, and typically both, of the panels, enhancing strength and rigidity of the structure. See the lock means at 50', 51' and 52' in FIG. 2, for locking ends of the respective swingable bars 20, 21 and 22, to the frame structure, at 53-55.

Figure 18:
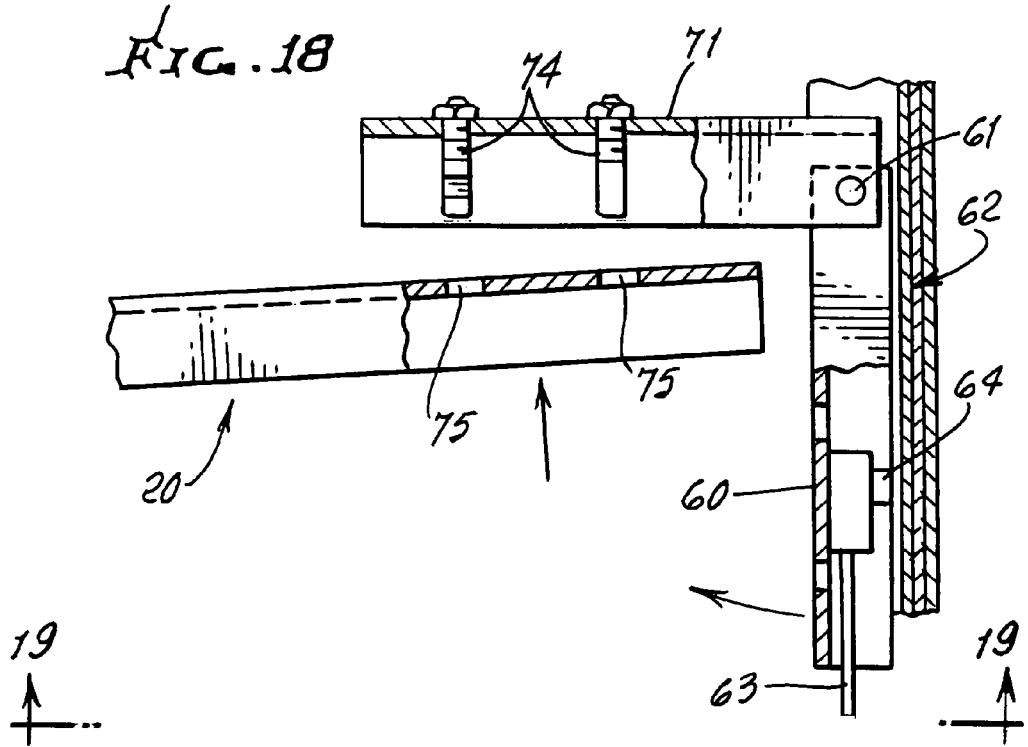
FIG. 18 is an elevation showing a modified connection of a cross member to a side panel.
Figure 19:
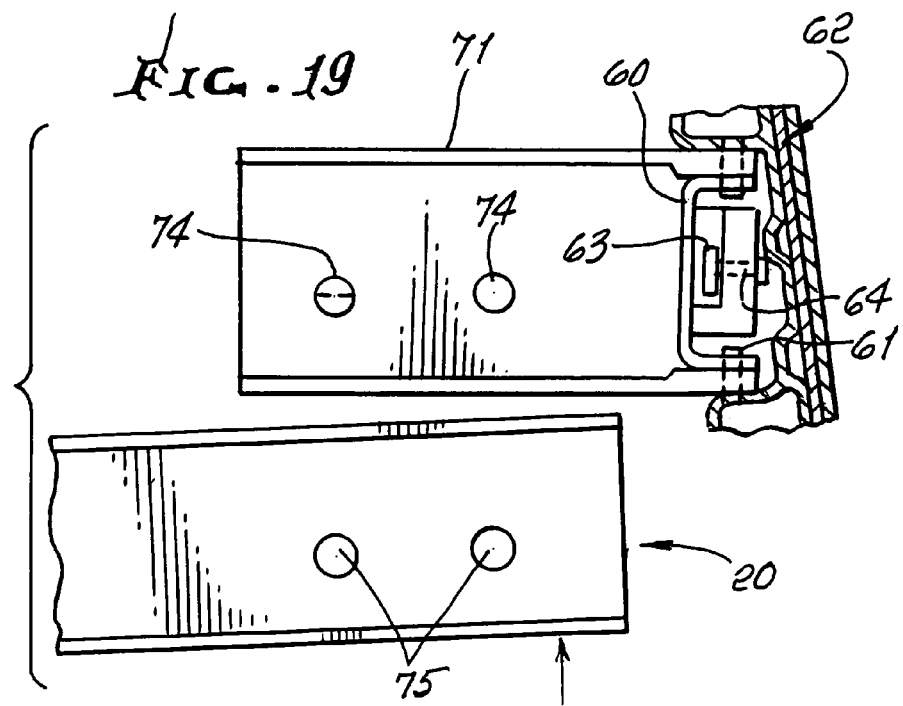
FIG. 19 is a plan view taken on lines 19-19 of FIG. 16.

FIGS. 15-19 show the lock means 50' to include lock body 60 pivotally carried at 61 by longitudinally movable slider structure 62. Lock arm 63 is pivotally carried at 64 by 62, to swing downwardly and lock to bar 20. FIGS. 11-14 show the lock means 52' to include a lock body 66 to which the end 22f of bar 22 is releasably lockable, as via actuator 67. See also push-in release element 68, spring urged at 69. Lock means 52 for bar 22 is similar to lock means 51. FIGS. 18 and 19 shows a lock means 60, incorporating lock body 60, attached to the frame part 72 at 61; body 71 carries threaded lock pins 74 receivable through holes 75 in a bar 20, corresponding to bars 21 and 22, for attached to threaded nuts.

Figure 20:
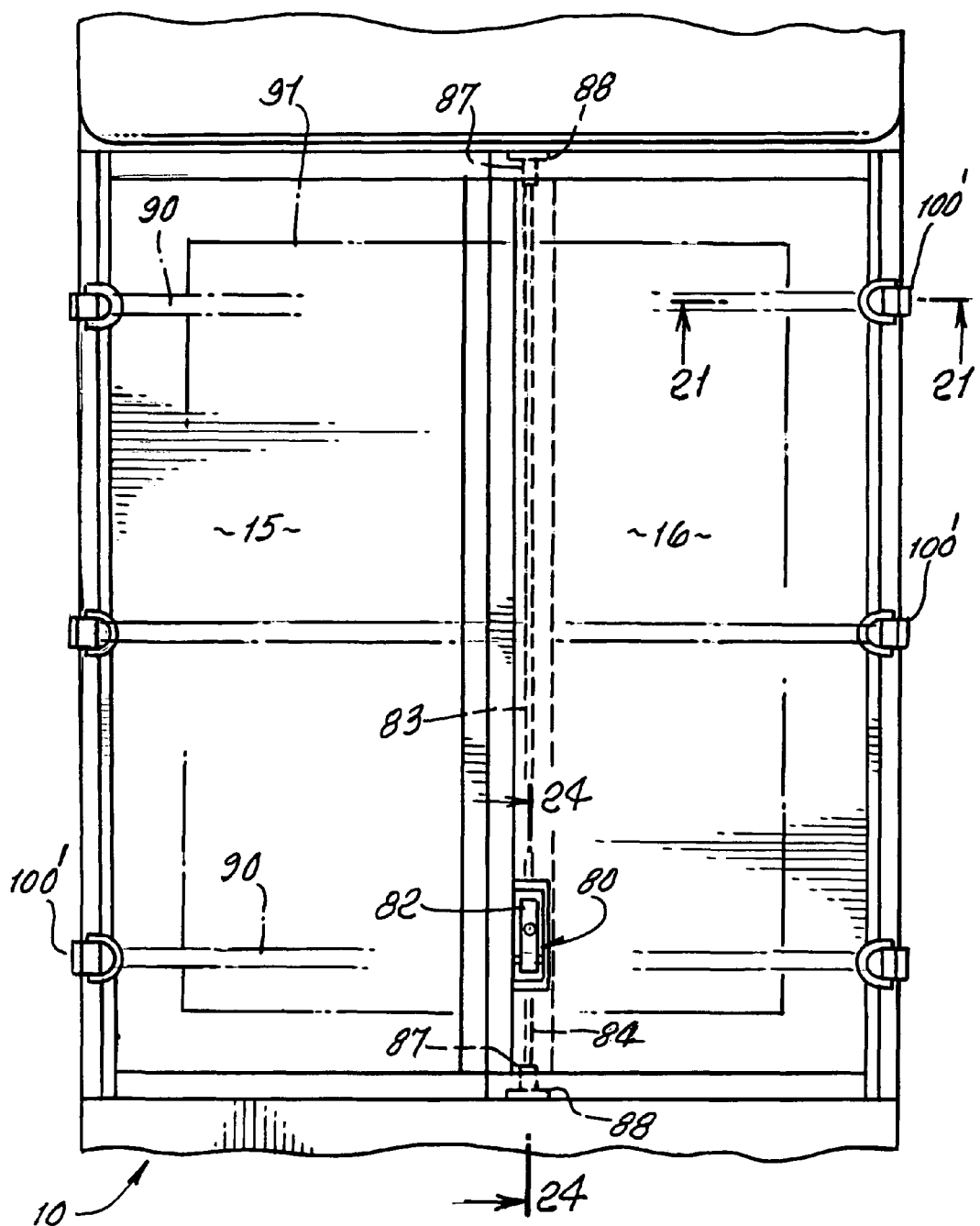
FIG. 20 is a top plan view of the assembly, with the side panels in down, i.e. cover closed position.

FIG. 20 is a top plan view showing the side panels 15 and 16 swung down in closed position to provide a cover over the truck bed. The closed together panels are lockable, as indicated by lock means 80, better shown in FIG. 24. A lock down lever 82 is shown connected to locking links 83 and 84, via rotor 85. When lever 82 is swung up, as in FIG. 25, links 83 and 84 are displaced endwise oppositely, to activate bell cranks as at 86, and pivoted at 85a, to rotate retainers 87 releasing retainer ends 87a from fixed frame structure 88, allowing the panels 15 and 16 to be pulled up, for upright position as in FIGS. 1 and 2. See also FIGS. 27 and 28.

Figure 22:
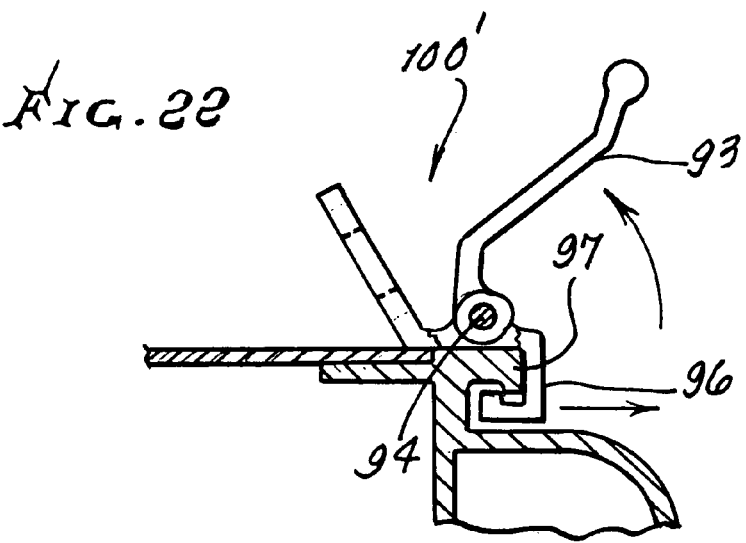
FIG. 22 is a fragmentary elevation showing the retaining handle of FIG. 21 in raised, strap releasing position.
Figure 23:
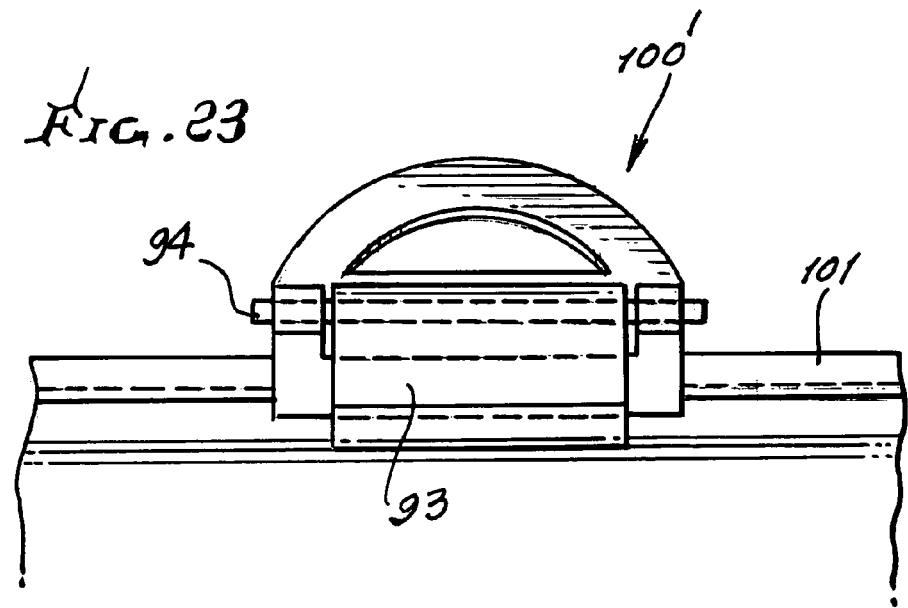
FIG. 23 is a side elevation showing a retention clip.
Figure 29:
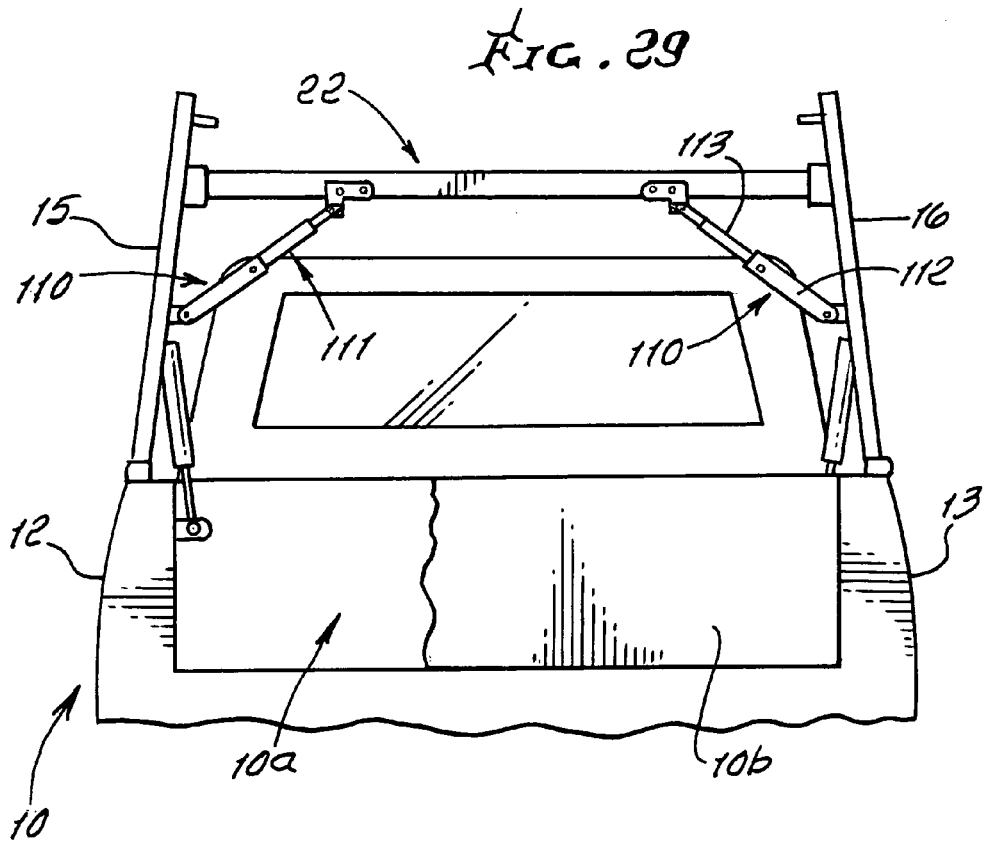
FIG. 29 is a view like FIG. 5, showing an improvement.
Figure 30:
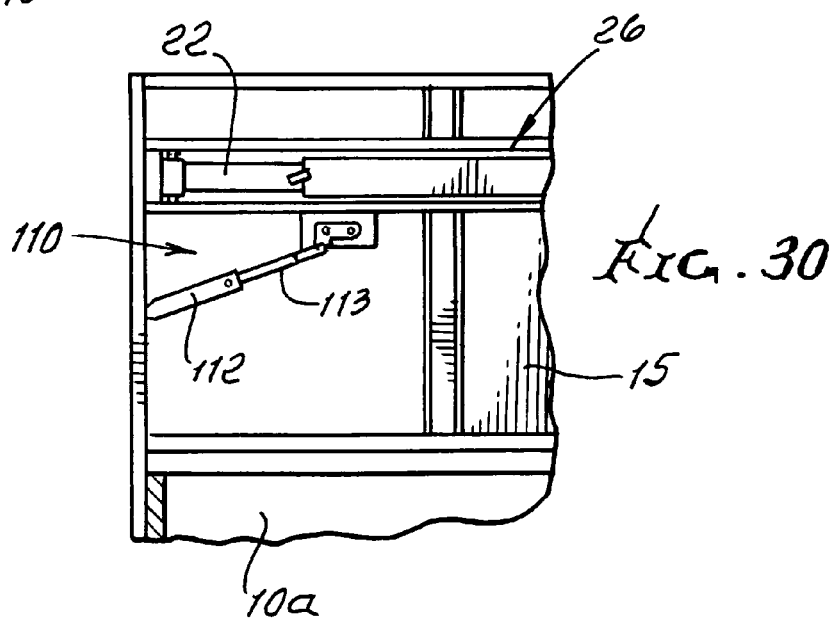
FIG. 30 is a view like FIG. 7, showing brace alternate positioning.

FIGS. 21 and 22 show a retention strap 90 extending over a load 91 on the truck bed 92. The end of the strap is connected to a portion 93a of a lever 93, pivoted at 94 to the truck side wall structure 95. When the lever is released, it pivots upwardly to release the C-shaped holder 96 from the frame side wall flange 97, allowing release of the strap. FIG. 23 shows one of a series of hold down clips 100' attachable to the truck side wall, and folding down over the horizontally projecting edges of the lowered side panels, for added retention.

FIGS. 29-35 show an improved load protection assembly mounted on a truck 100. As before, two side panels 15 and 16 are supported to pivot between horizontally extending down positions, and operative up-positions, extending generally longitudinally. Forward 20, intermediate 21 and rearward bars 22 have mid portions pivotally supported to enable bar pivoting between retracted positions proximate a panel or panels 15 and 16 and extended positions in which bars extend laterally between the panels in panel supporting relation.

Side bracing 110 is connected to panels to move into supporting position when the bars are extended laterally between the panels. That bracing includes a telescopic strut assembly 111 having first and second elongated struts 112 and 113, and an actuator 114 arm manually swingable or movable to relatively extend the struts configured lock to bar structure in position in response to actuator movement.

The apparatus typically further includes a carriage 50 (as before) to which the forward and intermediate bars are end connected to be bodily moved with the carriage longitudinally forwardly and rearwardly, the bars nesting in the carriage during panel pivoting between up and down positions.

A locking bracket 120 is provided to be pivotally connected at 121 to one of the struts, to lock the bracket to one of the bars, i.e. bar 22 as at 123, when the struts are relatively extended by the actuator, whereby a rigid panel and bar bracing action is provided. The bracket typically has two locking elements, as at openings 123a and 123b shiftable by the bracket in and out of locking relation with protrusions 124a and 124b on the bar at two locations, to maintain bracket over-center shifting generally parallel to the bar in response to actuator movement. Thus, the actuator has one extended position as in FIG. 32 in bracket locking position. Also, the bracket is located to be shifted between locking position, and release position in which elongated opening extensions 123a' and 123b' receive 124a and 124b, carried by the bar to release during bar swinging. One of the struts 112 is end supported by the pivot 130 at 121, and the other 113 of the struts pivotally supports the bracket 120. A highly useful, efficient, easily operated and compact panel locking and bracing assembly is thereby provided. FIGS. 33 and 34 show locked and unlocked positions.

Referring to FIGS. 36-45, highly reliable and improved panel lock-down means is provided for manual actuation to hold the panels swung-down, into generally horizontal positions to provide truck bed cover. Such lock down means includes:

i) rails extending lengthwise of the panels, ii) slot structure associated with the rails, iii) holders extending into the slot structure and movable therein lengthwise of the rails between retention positions in which the panels are retained downwardly, and release positions in which the panels are released for upward swinging.

Typically, rails are shown at 150 and 151, carried by the truck fixed side panels 160 and 161 carried and extending lengthwise at the tops of those side panels. Slot structure associated with the rails is indicated at 152.

The holders 153 extend downwardly into the slot structure, at 153a, and are movable therein lengthwise of the rails, between slot ends 155 and 156, and also between said panel retention position, and panel release position. The holders typically comprises downwardly spring urged pins 153a with lower ends shiftable into positions in the slot structure whereby the pins and structure 158 carrying the pins, and the panels are retained downwardly. Structure carrying the pins themselves is shown at 159, and mounted on the panels.

Handles 170 have spaced apart terminals 171 and 172 between which the pins are located, to be shifted along the rails into retention positions for holding the panels in down positions. Tie down straps 90 are connected to handle 170. Rail hinging is provided at 178.

I claim:

1. Load protection assembly mounted on a truck, that comprises:
   a) two side panels edge supported to pivot between horizontally extending down positions and operative up positions extending generally longitudinally,
   b) forward, intermediate, and rearward bars having end portions pivotally supported to enable bar pivoting between retracted positions proximate one of said panels and extended positions in which the bars extends laterally between the panels in panel supporting relation,
   c) and side bracing connected to the panels to move into supporting position when the bars are extended laterally between the panels, said bracing including a telescoping strut assembly having first and second elongated struts, and an actuator manually swingable to relatively extend and retract said struts configured to lock to one of the forward, intermediate, or rearward bars in response to actuator swinging,
   d) there being a carriage to which the forward and intermediate bars are end connected to be bodily moved with the carriage longitudinally forwardly and rearwardly.

2. The assembly of claim 1 wherein the forward and intermediate bars nest longitudinally in the carriage during panel pivoting between said up and down position.

3. The assembly of claim 1 wherein the bracing includes a bracket shiftably connected to one of the bars, and to one of the struts.

4. The assembly of claim 3 wherein the bracket has spaced shiftable connections to said one bar.

5. The assembly of claim 1 wherein the intermediate bar has sections that telescope together in bar retracted positions to allow nesting thereof in the carriage.

6. The assembly of claim 1 wherein the forward bar, in retracted position, nests in the carriage to be movable therewith, forwardly and rearwardly.

7. The assembly of claim 1 including lock means releasably locking the swingable ends of the bars to structure carried by at least one of the panels.

8. The assembly of claim 1 wherein the actuator has a collapsed bracing position adjacent the struts.

9. The assembly of claim 1 including holders releasably clipping to panel structure to retain straps extending across the panels in panel down position.

10. The assembly of claim 1 wherein the intermediate bar has sections that telescope together in bar retracted positions to allow nesting thereof in the carriage.

11. Load protection assembly mounted on a truck, that comprises:
    a) two side panels edge supported to pivot between horizontally extending down positions and operative up positions extending generally longitudinally,
    b) forward, intermediate, and rearward bars having end portions pivotally supported to enable bar pivoting between retracted positions proximate one of said panels and extended positions in which the bars extends laterally between the panels in panel supporting relation,
    c) and side bracing connected to the panels to move into supporting position when the bars are extended laterally between the panels, said bracing including a telescoping strut assembly having first and second elongated struts, and an actuator manually swingable to relatively extend and retract said struts configured to lock to one of the forward, intermediate, or rearward bars in response to actuator swinging, d) there being a locking bracket having openings to release from protrusions on a bar during bar swinging.

12. The assembly of claim 11 wherein said openings are spaced apart in bar elongation direction.

13. The assembly of claim 1 including panel lock down means carried by the panels for manual actuation to hold the panels in generally horizontal positions providing cover for the truck bed.

14. The assembly of claim 9 including strap structure for extending over a load on the horizontal panels, said lock down means holding the strap structure in retained position over the load.

15. The assembly of claim 13 including at least one pin releasably and adjustably connecting a truck side wall to an edge or edges of the horizontal panel or panels.

16. The assembly of claim 15 wherein the pins include plungers, there being receiver structure therefor.

17. Method of assembling a load protection assembly that includes
   a) two side panels edge supported to pivot between horizontally extending down positions and operative up positions extending generally longitudinally,
   b) forward, intermediate, and rearward bars having end portions pivotally supported to enable bar pivoting between retracted positions proximate one of said panels and extended positions in which the bars extend laterally between the panels in panel supporting relation,
   c) and side bracing connected to the panels to move into supporting position when the bars are extended laterally between the panels, said bracing including a telescoping strut assembly having first and second elongated struts, and an actuator manually swingable to relatively extend and retract said struts configured to lock to one of the forward, intermediate, or rearward bars in response to actuator swinging
   d) there being a carriage to which the forward and intermediate bars are end connected to be bodily moved with the carriage longitudinally forwardly and rearwardly, said method including the steps
      i) elevating the side panels,
      ii) pivoting the bars and end connecting the bars to the side panels,
      iii) adjusting the forward and intermediate bars to allow said carriage forward or rearward movement,
      iv) and swinging said actuator to extend the struts into locking positions.

18. Load protection assembly mounted on a truck, that comprises:
   a) two side panels edge supported to pivot between horizontally extending down positions and operative up positions extending generally longitudinally,
   b) forward, intermediate, and rearward bars having end portions pivotally supported to enable bar pivoting between retracted positions proximate one of said panels and extended positions in which the bars extends laterally between the panels in panel supporting relation,
   c) and side bracing carried by the panels to pivot into bar supporting positions when the bars are extended laterally between the panels, said bracing including telescoping struts, and locking brackets pivotally carried by said struts,
   d) there being a carriage to which the forward and intermediate bars are end connected to be bodily moved with the carriage longitudinally forwardly and rearwardly,
   e) and including panel lock down means carried by the panels for manual actuation to hold the panels in generally horizontal positions providing cover for the truck bed,
   f) said lock down means including links located to be displaced endwise oppositely, link actuated bell cranks and retainers displaced by the respective bell cranks to release from fixed frame structure to allow the panels to be pulled upwardly into upright positions.

19. The assembly of claim 18 wherein the retainers are pivotally carried by the frame structure.

20. The assembly of claim 18 wherein the bell cranks have pivotal mounting at first locations, and the retainers have pivotal mounting at second locations, said first and second locations being spaced apart, at the frame structure.

21. The assembly of claim 19 including lock down lever means operatively connected with said links, extending sidewardly in relation to the forward, intermediate, and rearward bars.

22. The assembly of claim 13 wherein the lock down means includes
   i) rails extending lengthwise of the panels,
   ii) slot structure associated with the rails,
   iii) holders extending into the slot structure and movable therein lengthwise of the rails between retention position in which the panels are retained downwardly, and release positions in which the panels are released for upward swinging.

23. The assembly of claim 22 wherein the holders comprises spring-urged pins with ends shiftable into positions in the slot structure, whereby the pins and panels are retained downwardly.

24. The assembly of claim 22 including structure on the panels carrying the holders.

25. The assembly of claim 22 including handles carried by the panels and having spaced terminals between which the pins are located to be shifted along the rails by the handles, between panels tie down position, and panel released positions.

* * * * *